US010823331B1

(12) United States Patent
Donelick et al.

(10) Patent No.: US 10,823,331 B1
(45) Date of Patent: Nov. 3, 2020

(54) BIG MASS BATTERY INCLUDING MANUFACTURED PRESSURE VESSEL FOR ENERGY STORAGE

(71) Applicant: BIMBY POWER COMPANY, LLC., Reno, NV (US)

(72) Inventors: Raymond Allen Donelick, Viola, ID (US); Margaret Burke Donelick, Viola, ID (US); Greg Bonarr Arehart, Reno, NV (US)

( * ) Notice: Subject to any disclaimer, the term of this patent is extended or adjusted under 35 U.S.C. 154(b) by 0 days.

(21) Appl. No.: 16/372,168

(22) Filed: Apr. 1, 2019

Related U.S. Application Data

(63) Continuation of application No. 15/078,881, filed on Mar. 23, 2016, now Pat. No. 10,288,221.

(Continued)

(51) Int. Cl.
*F17C 1/00* (2006.01)
*F03D 9/28* (2016.01)
(Continued)

(52) U.S. Cl.
CPC ............ *F17C 1/007* (2013.01); *F03D 9/257* (2017.02); *F03D 9/28* (2016.05); *F17C 13/081* (2013.01);
(Continued)

(58) Field of Classification Search
CPC . F02C 6/16; F17C 1/007; F17C 3/005; B65G 5/00; B65G 5/005; Y02E 60/15; F03D 9/17

See application file for complete search history.

(56) References Cited

U.S. PATENT DOCUMENTS 2,454,058 A 11/1948 Hays
2,947,147 A 8/1960 Johnson
(Continued)

FOREIGN PATENT DOCUMENTS

CA 2789877 A1 8/2011
WO 2010005954 A2 1/2010
(Continued)

OTHER PUBLICATIONS

Anderson, R., Mar. 2, 2015, Energy storage paves way for electricity independence, BBC News, http://www.bbc.com/news/business-31040723.
(Continued)

*Primary Examiner* — Abiy Teka
*Assistant Examiner* — Michael Quandt
(74) *Attorney, Agent, or Firm* — Renaissance IP Law Group, LLP; David A. Crowther

(57) ABSTRACT

Embodiments of the inventive concept include a manufactured pressure vessel including pressure cells having an impermeable layer containing porous material in which air can permeate, and a big mass layer disposed atop the pressure vessel to pressurize the air within the pressure vessel. The impermeable layer can include rubber from recycled vehicle tires. The big mass layer can have a total weight of between one (1) million and one (1) billion tonnes, or more. The big mass layer can include a remediated upper surface. The pressure vessel can include an interface section through which the air can enter and exit the pressure vessel. Pressure lines can be coupled to the interface section. A turbine center can be coupled to the pressure lines to generate electricity in response to pressurized air received through the pressure lines, or to pump air through the pressure lines into the pressure vessel to pressurize the pressure vessel.

13 Claims, 30 Drawing Sheets

Related U.S. Application Data

(60) Provisional application No. 62/137,730, filed on Mar. 24, 2015.

(51) Int. Cl.
  *F17C 13/08* (2006.01)
  *F03D 9/25* (2016.01)
  *F02C 6/16* (2006.01)
  *F03D 9/17* (2016.01)

(52) U.S. Cl.
  CPC .............. *F02C 6/16* (2013.01); *F03D 9/17* (2016.05); *F17C 2201/0166* (2013.01); *F17C 2201/052* (2013.01); *F17C 2221/031* (2013.01); *F17C 2270/016* (2013.01); *F17C 2270/0149* (2013.01); *Y02B 10/30* (2013.01); *Y02B 10/70* (2013.01); *Y02E 10/72* (2013.01); *Y02P 70/50* (2015.11)

(56) References Cited

U.S. PATENT DOCUMENTS

| | | | |
|---|---|---|---|
| 3,119,407 A * | 1/1964 | Timmerman, Sr. | B65D 90/26 137/386 |
| 3,703,976 A | 11/1972 | Hansel et al. | |
| 3,996,741 A | 12/1976 | Herberg | |
| 4,206,608 A | 6/1980 | Bell | |
| 5,491,969 A | 2/1996 | Cohn et al. | |
| 5,634,340 A | 6/1997 | Grennan | |
| 6,420,457 B1 * | 7/2002 | Wicks | C08J 3/28 521/41 |
| 6,840,710 B2 | 1/2005 | Peters et al. | |
| 7,472,548 B2 | 1/2009 | Meksvanh et al. | |
| 7,972,080 B2 | 7/2011 | Summers et al. | |
| 8,166,760 B2 | 5/2012 | Fiske | |
| 8,405,242 B2 | 3/2013 | Borden et al. | |
| 8,737,558 B2 | 5/2014 | Fiske | |
| 9,022,692 B2 * | 5/2015 | Frazier | E02D 29/10 405/210 |
| 2009/0173142 A1 | 7/2009 | Peters et al. | |
| 2010/0307147 A1 | 12/2010 | Ivy et al. | |
| 2011/0025058 A1 | 2/2011 | Nies | |
| 2012/0181160 A1 | 7/2012 | Cheiky | |
| 2013/0009469 A1 | 1/2013 | Gillett | |
| 2013/0121767 A1 | 5/2013 | Bernica et al. | |
| 2014/0013735 A1 | 1/2014 | McBride et al. | |
| 2014/0214231 A1 | 7/2014 | Parsonnet et al. | |
| 2014/0261132 A1 | 9/2014 | Zeren et al. | |

FOREIGN PATENT DOCUMENTS

| | | |
|---|---|---|
| WO | 2010138677 A2 | 12/2010 |
| WO | 2011047456 A1 | 4/2011 |
| WO | 2011133885 A1 | 10/2011 |
| WO | 2013119327 A1 | 8/2013 |
| WO | 2014053662 A1 | 4/2014 |
| WO | 2014140962 A1 | 9/2014 |
| WO | 2016020709 A1 | 2/2016 |

OTHER PUBLICATIONS

Anderson, R., Apr. 23, 2014, Energy storage: The key to a smarter power grid. BBC News, http://www.bbc.com/news/business-27071303.

Babcock, Josh, talk Mar. 25, 2015, article Mar. 26, 2015, Pullman benefits from energy saving project. Moscow-Pullman Daily News, TPC Holdings, Inc., Lewiston, Idaho, U.S.A.

Oliver, L. (News Editor), Mar. 20, 2015, Energy storage topic of LWV meeting. Moscow-Pullman Daily News, TPC Holdings, Inc., Lewiston, Idaho, U.S.A.

PCT/US2016/023836, ISR and Written Opinion, dated Jul. 4, 2016.

* cited by examiner

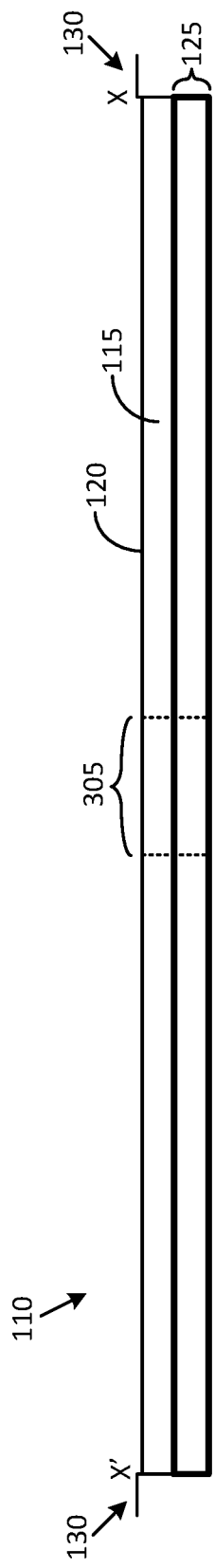
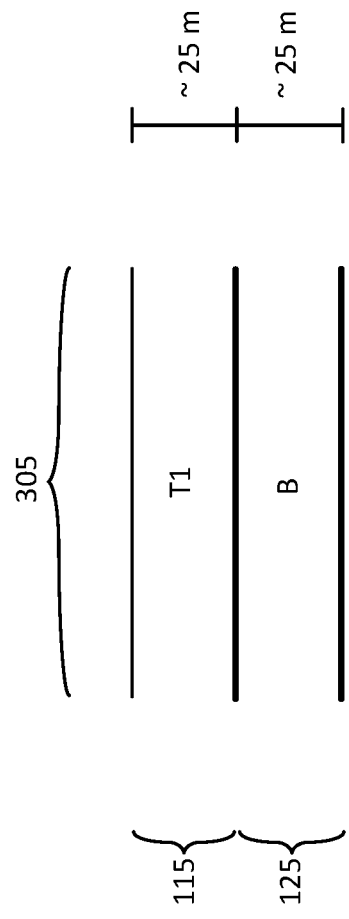
FIG. 3A
FIG. 3B

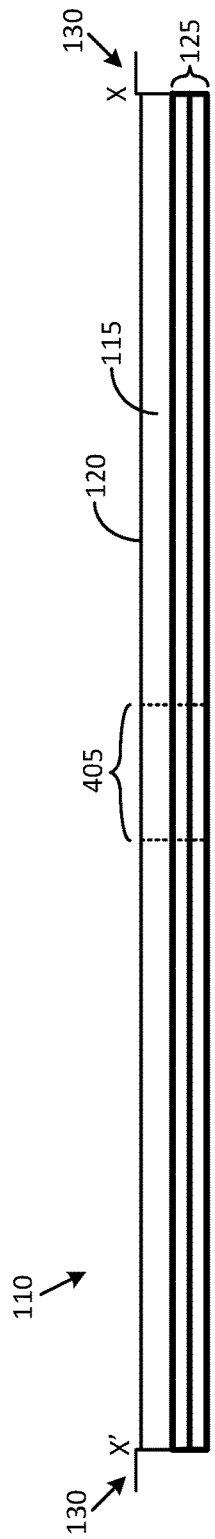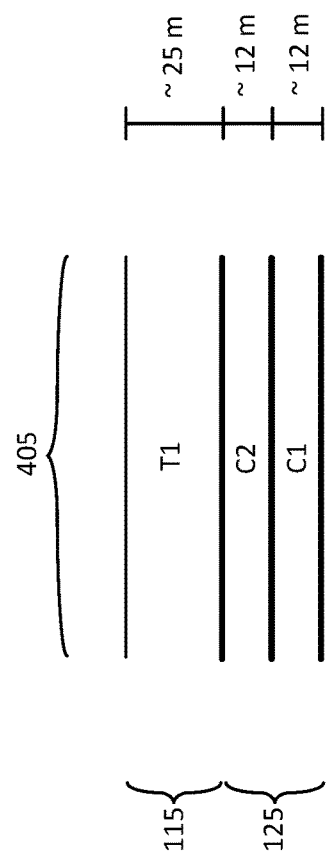
FIG. 4A
FIG. 4B

BIG MASS BATTERY INCLUDING MANUFACTURED PRESSURE VESSEL FOR ENERGY STORAGE

RELATED APPLICATION DATA

This application is a continuation of U.S. patent application Ser. No. 15/078,881, filed on Mar. 23, 2016, which claims the benefit of co-owned U.S. Provisional Patent Application Ser. No. 62/137,730, filed Mar. 24, 2015, which is hereby incorporated by reference.

TECHNICAL FIELD

This application pertains to energy storage, and more particularly, to a big mass battery including a pressure vessel for storing energy on a massive scale.

BACKGROUND

Energy is the lifeblood of civilization. Without access to affordable and clean energy sources, civilizations struggle to advance their modern societies. While advances in the areas of clean energy generation have been prevalent in the past few decades, advances in energy storage technologies have not been as prevalent, and are woefully inadequate in terms of cost and performance. This presents a particularly acute problem because most clean energy generation technologies are periodic in nature. For example, the output from solar farms occurs only during the day. By way of another example, the output from wind farms is somewhat unpredictable due to changes in weather patterns. Because of the uneven generation schedules, the energy must be stored for later use, or otherwise wasted.

Even with the latest advances in chemical battery technologies, such storage technology still remains prohibitively expensive and impractical—particularly on a large scale, and also have the disadvantage that they consume new raw materials to produce new battery units. Moreover, the relatively short life expectancy of conventional chemical batteries means that businesses must often allocate additional capital to the repair or replacement of large battery installations.

Today, approximately ⅔ of the energy sources used to generate electricity in the U.S. are fossil-fuel based. Burning fossil fuels to generate electricity emits $CO_2$ into the atmosphere. Scientific research indicates that the increasing $CO_2$ content in the atmosphere due to burning fossil fuels is changing the atmospheric weather on Earth. Public policy in the U.S. and world-wide is increasingly focusing on lowering and ultimately eliminating $CO_2$ emissions. One approach to minimizing $CO_2$ emissions is to replace fossil fuels sources with renewable, intermittent or cyclical, low-carbon energy sources such as solar photovoltaic, wind, ocean wave, lake wave, ocean tide, lake current, river current, or the like.

Fossil fuels enable near on-demand generation of electricity: when demand is higher, more fossil fuels are burned in a power plant to increase the amount of electricity being burned. But electricity consumption is intermittent, cyclical, and seasonal. The demand for electricity is largely decoupled from the natural processes that give rise to the intermittent and cyclical nature of the availability of some renewable energy sources. It is common for wind energy to vary from a minimum of near zero to a typical maximum over a typical period on the order of days to a week. The intensity of sunlight at a location varies strongly with the time of day, season, weather, air clarity, and so forth. Oceanic wave energies vary on the hourly to monthly timescales. Oceanic tidal energies range from a typical minimum to a typical maximum approximately twice daily.

Accordingly, a need remains for improved methods and systems for storing energy on a massive scale. Embodiments of the invention address these and other limitations in the prior art.

BRIEF DESCRIPTION OF THE DRAWINGS

FIG. 3A illustrates another example cross sectional view taken along X'-X of the big mass battery including the manufactured pressure vessel of FIG. 1.

FIG. 3B illustrates a close-up view of a section of the cross sectional view of FIG. 3A.

FIG. 4A illustrates yet another example cross sectional view taken along X'-X of the big mass battery including the manufactured pressure vessel of FIG. 1.

FIG. 4B illustrates a close-up view of a section of the cross sectional view of FIG. 4A.

Figure 1:
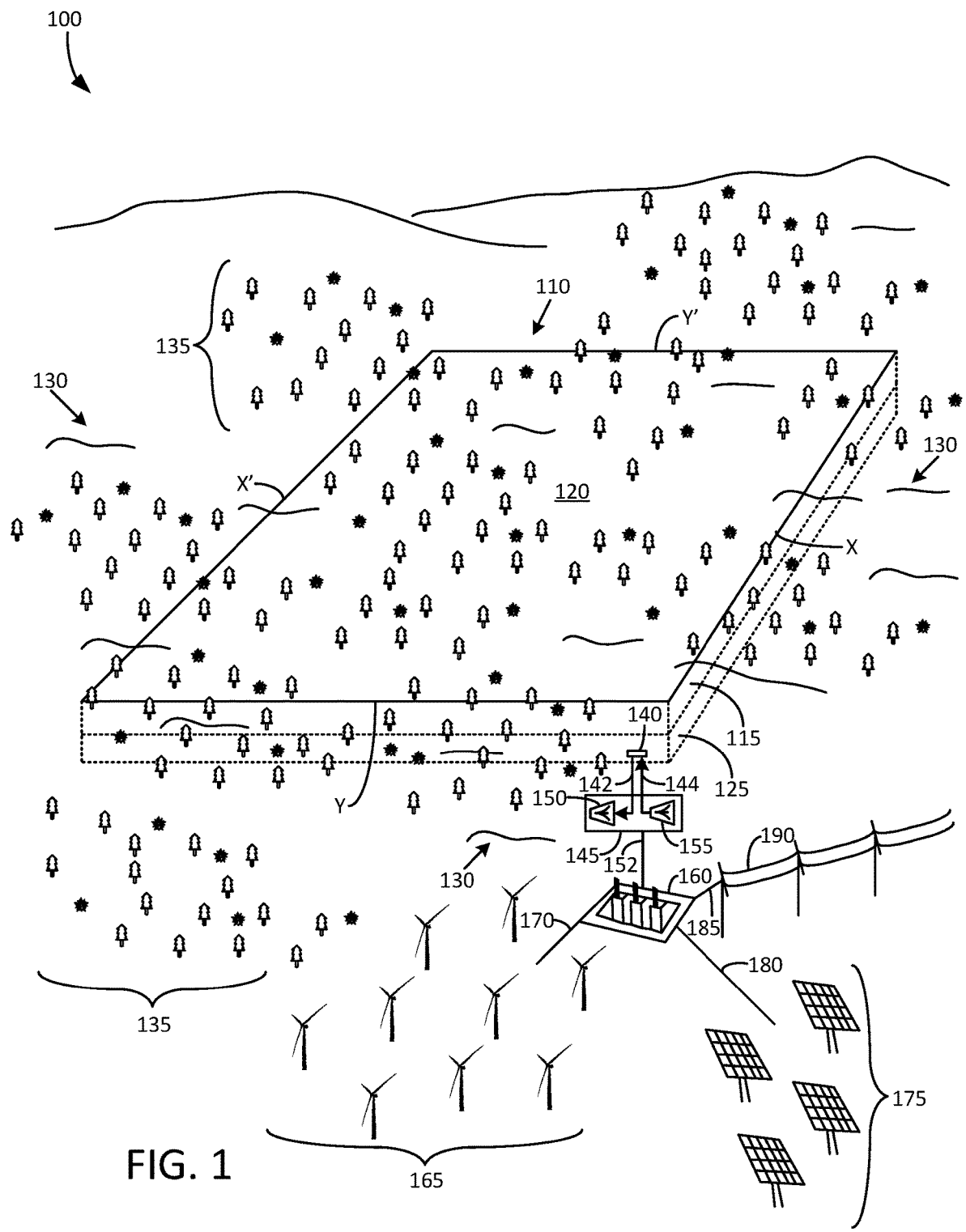
FIG. 1 illustrates an example perspective view of a big mass battery system including a big mass battery and a manufactured pressure vessel for energy storage, built in the vicinity of a strip mine, in accordance with various embodiments of the inventive concept.

The foregoing and other features of the various embodiments of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a data set could be termed a second data set, and, similarly, a second data set could be termed a first data set, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept include a big mass battery for storing energy on a massive scale. Embodiments of the inventive concept can be used to accumulate and store energy during timer periods when excess energy is available from renewable sources such as wind, solar, geothermal, ocean wave, lake wave, ocean tide, ocean current, lake current, river current, or the like. Embodiments of the inventive concept can be used to release energy during time periods when electricity consumers demand electricity.

To replace near-on-demand fossil fuel sources with intermittent or cyclical renewable energy sources, it is necessary to couple electricity generation to demand. This can be accomplished using intermittent or cyclical renewable energy sources by storing renewable energy when it is available and releasing it to generate electricity on-demand when electricity is needed. The capacity of energy storage needed to permit the replacement of fossil fuel burning with renewable energy sources for the U.S. electricity grid is probably on the order of ¼ to ½ of the present-day fossil fuel net generation, or ⅙ to ⅓ of overall net generation (as fossil fuel net generation accounts for about ⅔ of overall net generation in the U.S.).

A future U.S. electricity grid that is dominated by intermittent and cyclical renewable energy sources and with usage demand largely decoupled from renewable energy availability on a local or even regional spatial scale likely requires energy storage capacity perhaps ¼ to ½ of the net generating capacity of the renewable energy sources when such sources are running at average their average capacity. Embodiments of the inventive concept disclosed herein concern the building of large-scale, non-chemical big mass batteries, using local materials. Each big mass battery can have energy storage and electricity generation capacities similar in scale to that of a typical power plant. Embodiments of the inventive concept disclosed herein may be the missing, strategic piece of the puzzle that will enable large scale replacement in the U.S. of fossil fuel electricity generating power plants with renewable energy power plants. The geographical distribution of this energy storage capacity ideally correlates with the geographical distribution of the renewable energy sources and/or the locations of the electricity consumers.

As used herein, the term "big mass" is mass on the order of 1s to 1000s of millions of tonnes. For example, the big mass used in a big mass battery can have a total weight or mass of between one (1) million and one (1) billion tonnes, or more. By way of another example, the big mass used in a big mass battery can have a total weight or mass of between one (1) million and two (2) billion tonnes, or more. By way of another example, the big mass used in a big mass battery can have a total weight or mass of between one (1) million and three (3) billion tonnes, or more. By way of another example, the big mass used in a big mass battery can have a total weight or mass of between one (1) million and five (5) billion tonnes, or more. By way of another example, the big mass used in a big mass battery can have a total weight or mass of between one (1) million and ten (10) billion tonnes, or more. Various human activities, on an integrated annual basis yield big mass having one or more of the following characteristics: it is loaded onto trucks or other transport mechanisms, it is moved across the surface of the Earth, and it is dumped or placed into temporary or permanent storage. For example, people worldwide create big mass in the form of municipal solid waste, mineral processing wastes from mining (e.g., mine overburden, waste rock, and tailings), coal ash, soil and rock contaminated with unwanted chemicals and/or isotopes, or the like.

The term big mass battery as used herein is an energy storage device that uses big mass for pressurizing a pressure vessel. The pressure vessel can include fluid input piping and fluid output piping to accumulate, store, and release compressed air. The compressed air can be pressurized using renewable energy sources, and subsequently released to generate electricity on demand using one or more turbines.

Building big mass battery devices for energy storage may offer a coal mining community a life line and a new, renewable energy-based, electricity-producing economy separate from the historical and current, coal-based, electricity-producing economy. Coal mines and the communities they support that adapt and build big mass battery devices may outlive mines and communities that do not. Big mass battery devices may offer hope for jobs and families in coal mining communities. Importantly, the U.S. currently needs coal mining for the foreseeable future because in 2014 coal powered about 39% of the U.S. electrical grid, and it will likely take 20+ years to phase out and replace coal. Embodiments of the inventive concept described herein, when built in conjunction with an active coal mine, may provide a win-win situation for the old and new economies.

FIG. 1 illustrates an example perspective view of a big mass battery system 100 including a big mass battery 110 and a manufactured pressure vessel 125 for energy storage, built in the vicinity of a strip mine, in accordance with various embodiments of the inventive concept. General edge boundaries of the big mass battery 110 are indicated by X', X, Y', and Y designators. The big mass battery 110 includes mine overburden 115 disposed atop the manufactured pressure vessel 125. The big mass battery 110 can occupy the strip mine. The upper surface 120 of the mine overburden 115 can be remediated. For example, trees and vegetation (e.g., 135) can be planted to grow on the remediated surface 120, farmland cultivated, grazing areas established, or the like. The upper surface 120 of the mine overburden 115 can be substantially coplanar with a surface 130 of the surrounding terrain. Walls of the manufactured pressure vessel 125 can include a substantially impermeable layer that is capable of substantially containing a fluid such as compressed air, water, or the like. The impermeable layer can have a low fraction by volume of interconnected pores and a relatively low permeability. For example, the impermeable layer of the walls of the manufactured pressure vessel 125 can be constructed of rubber. The rubber material can be recycled rubber, for example, from discarded rubber vehicle tires. The pressure vessel 125 can also contain porous earthen materials such as sand, gravel, stones, or the like, within which the fluid (e.g., air, water, or the like) can permeate. In some embodiments, the big mass battery 110 is about 1000 meters long and about 1000 meters wide. It will be understood that other suitable dimensions are possible without departing from the various embodiments of the inventive concept disclosed herein.

Gravity can cause the mine overburden 115 to apply pressure to the pressure vessel 125. The pressure vessel 125 can include an interface section 140 through which the fluid (e.g., air, water, or the like) can enter and exit the pressure vessel 125 via one or more pressure lines (e.g., 142 and 144). The one or more pressure lines (e.g., 142 and 144) can be coupled to the interface section 140. For example, the fluid can enter the pressure vessel 125 via pressure line 144 and/or exit the pressure vessel 125 via pressure line 142. The pressure lines (e.g., 142 and 144) can include a pipe, a hose, a tunnel, or the like. In some embodiments, a single pressure line can be used through which the fluid can both enter and exit the pressure vessel 125. In some embodiments, a pressure line can be used to pump water out from one or more pressure cells of the pressure vessel 125. For example, water can be pumped out of porous medium parts within the pressure vessel 125. In some embodiments, a pressure line can be used to inject air into one or more pressure cells of the pressure vessel 125. In some embodiments, a pressure line can be used for producing or extracting air from one or more pressure cells of the pressure vessel 125. The pressure lines (e.g., 142 and 144) can be connected to a turbine center 145.

The turbine center 145 can include one or more turbines (e.g., 150 and 155). The one or more turbines (e.g., 150 and 155) can generate electricity by way of pressurized fluid received via the one or more pressure lines (e.g., 142 and 144). Alternatively or in addition, the one or more turbines (e.g., 150 and 155) can pump fluid into the pressurized vessel 125 via the one or more pressure lines (e.g., 142 and 144).

The turbine center 145 can be connected to a power station 160 via electrical line 152. The electrical line 152 can be, for example, an electrical cable. The turbine center 145 can provide electricity to the power station 160 via the electrical line 152. In some embodiments, the turbine center 145 can draw electricity from the power station 160 via the electrical line 152. The power station 160 can be connected to a wind farm 165 via electrical line 170, and/or to a solar farm 175 via electrical line 180. The power station 160 can receive electricity from the wind farm 165 via the electrical line 170, and/or from the solar farm 175 via the electrical line 180. The power station 160 can provide electricity to the electrical grid via an electrical line 185 and power grid lines 190, and/or receive electricity from the electrical grid via the electrical line 185 and the power grid lines 190.

During off-peak times, or when the power station 160 otherwise receives electricity from the wind farm 165, the solar farm 175, and/or the power grid lines 190, that is more than can be immediately accommodated or transferred to the grid, the power station 160 can send the excess electricity to the turbine center 145 via the electrical line 152. The turbine center 145 can then pump the fluid (e.g., air, water, or the like) into the pressure vessel 125 via the one or more pressure lines (e.g., 142 and 144), which provides gravity and pressure-based energy storage on a massive scale.

Figure 2A:
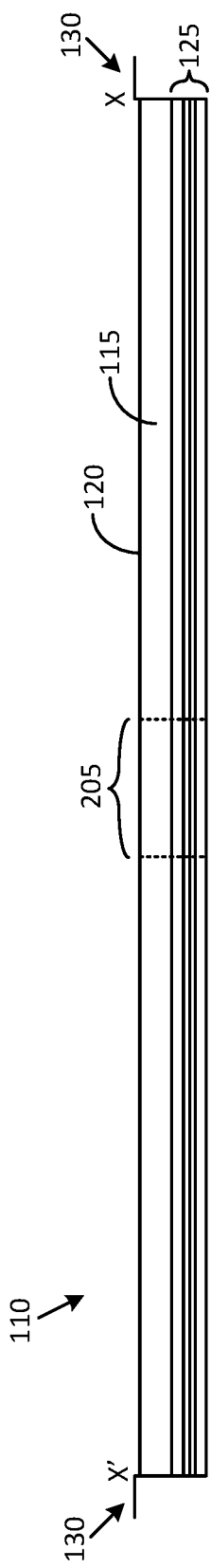
FIG. 2A illustrates an example cross sectional view taken along X'-X of the big mass battery including the manufactured pressure vessel of FIG. 1.
Figure 2B:
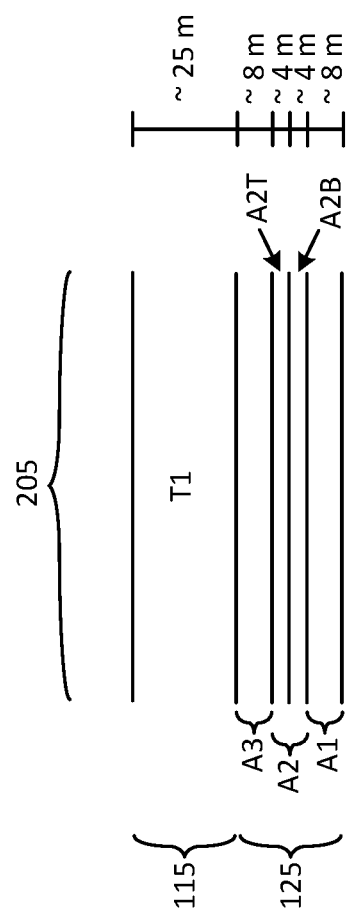
FIG. 2B illustrates a close-up view of a section of the cross sectional view of FIG. 2A.

FIG. 2A illustrates an example cross sectional view taken along X'-X of the big mass battery 110 including the manufactured pressure vessel 125 of FIG. 1. FIG. 2B illustrates a close-up view of a section 205 of the cross sectional view of the big mass battery 110 of FIG. 2A. Reference is now made to FIGS. 2A and 2B. Some of the elements are described above, and thus, a detailed description of such elements is not repeated.

In the close-up view of the section 205 of the cross sectional view of the big mass battery 110, various layers are shown. For example, layer T1 corresponds to the mine overburden 115, which pressurizes the manufactured pressure vessel 125 due to the weight of the mine overburden 115 by way of gravity. Layers A1, A2 divided into sub-layers A2B and A2T, and A3 correspond to the manufactured pressure vessel 125. More specifically, layers A1, A2 divided into sub-layers A2B and A2T, and A3 correspond to porous medium parts of the manufactured pressure vessel 125. The porous medium parts A1, A2 divided into sub-layers A2B and A2T, and A3 can contain an earthen material, a spongy material, and/or mineral processing waste. For example, the porous medium part A2B can contain an interior material or mix of materials having a first type, and the porous medium part A2T can contain an internal material or mix of materials having a second type. The porous medium part can have a relatively high fraction by volume of interconnected pores and a relatively high permeability.

The various layers and sub-layers (e.g., A1, A2, and A3) or combination of layers and/or sub-layers (e.g., A1 plus A2 plus A3) of the manufactured pressure vessel 125 can be self-contained pressure cells, as further described below. The internal pressure of a particular layer is dependent on the number and kind of layers above the particular layer. For example, the layer A1 has an internal pressure greater than each of the layers A2 and A3, and the layer A2 has an internal pressure greater than the layer A3. Consequently, the layer A1 can store more energy per unit volume of interconnected pore space than each of the layers A2 and A3, and the layer A2 can store more energy per unit volume of interconnected pore space than the layer A3. In some embodiments, the layer A3 is about eight (8) meters in depth, the layer A2B is about four (4) meters in depth, the layer A2T is about four (4) meters in depth, the layer A3 is about eight (8) meters in depth, and the layer T1 is about twenty-five (25) meters in depth. It will be understood that other suitable dimensions are possible without departing from the various embodiments of the inventive concept disclosed herein.

FIG. 3A illustrates another example cross sectional view taken along X'-X of the big mass battery 110 including the manufactured pressure vessel 125 of FIG. 1. FIG. 3B illustrates a close-up view of a section 305 of the cross sectional view of the big mass battery 110 of FIG. 3A. Reference is now made to FIGS. 3A and 3B, designated herein as Strip Mine A. Some of the elements are described above, and thus, a detailed description of such elements is not repeated.

The pressure vessel 125 shown in FIGS. 3A and 3B includes a single pressure cell B. The fluid (e.g., air, water, or the like) is contained within the single impermeable pressure cell B. The pressure cell B of the pressure vessel 125 can also contain porous earthen materials such as sand, gravel, stones, or the like, within which the fluid (e.g., air, water, or the like) can permeate. The pressure cell B can include the interface section 140 (of FIG. 1) through which the fluid (e.g., air, water, or the like) can enter and exit the pressure vessel 125 via the one or more pressure lines (e.g., 142 and 144 of FIG. 1). The mine overburden 115 is shown as a layer T1.

In the close-up view of the section 305 of the cross sectional view of the big mass battery 110, two layers are shown. For example, layer T1 corresponds to the mine overburden 115, which pressurizes the manufactured pressure vessel 125 due to the weight of the mine overburden 115 by way of gravity. Layer B is a single layer of the manufactured pressure vessel 125. In other words, in this example embodiment, the manufactured pressure vessel 125 includes a single pressure cell. The bold lines shown in FIGS. 3A and 3B represent pressure cell boundaries of the manufactured pressure vessel 125.

In some embodiments, the mine overburden layer T1 is about twenty-five (25) meters in depth, and the single pressure cell B is about twenty-five (25) meters in depth. It will be understood that other suitable dimensions are possible without departing from the various embodiments of the inventive concept disclosed herein.

FIG. 4A illustrates yet another example cross sectional view taken along X'-X of the big mass battery 110 including the manufactured pressure vessel 125 of FIG. 1. FIG. 4B illustrates a close-up view of a section 405 of the cross sectional view of FIG. 4A. Reference is now made to FIGS. 4A and 4B, designated herein as Strip Mine B. Some of the elements are described above, and thus, a detailed description of such elements is not repeated.

The pressure vessel 125 shown in FIGS. 4A and 4B includes two pressure cells C1 and C2. Each of the pressure cells (e.g., C1 and C2) is isolated from the other. In other words, the fluid (e.g., air, water, or the like) is contained within each individual impermeable pressure cell (e.g., C1 and C2). Each of the pressure cells (e.g., C1 and C2) of the pressure vessel 125 can also contain porous earthen materials such as sand, gravel, stones, or the like, within which the fluid (e.g., air, water, or the like) can permeate. The lower-situated pressure cell C1 can include the interface section 140 (of FIG. 1) through which the fluid (e.g., air, water, or the like) can enter and exit the pressure vessel 125 via the one or more pressure lines (e.g., 142 and 144 of FIG. 1). The pressure cell C2 can also include an interface section 140 (of FIG. 1), which can primarily be used to pressurize the pressure cell C2. The mine overburden 115 is shown as a layer T1.

In the close-up view of the section 405 of the cross sectional view of the big mass battery 110, three layers (e.g., C1, C2, and T1) are shown. For example, layer T1 corresponds to the mine overburden 115, which pressurizes the manufactured pressure vessel 125 due to the weight of the mine overburden 115 by way of gravity. Layer C1 corresponds to a first pressure cell of the manufactured pressure vessel 125. Layer C2 corresponds to a second pressure cell of the manufactured pressure vessel 125. In other words, in this example embodiment, the manufactured pressure vessel 125 includes two separate pressure cells. The bold lines shown in FIGS. 4A and 4B represent pressure cell boundaries of the manufactured pressure vessel 125.

In some embodiments, the mine overburden layer T1 is about twenty-five (25) meters in depth, the upper pressure cell C2 is about twelve (12) meters in depth, and the lower-situated pressure cell C1 is about twelve (12) meters in depth. It will be understood that other suitable dimensions are possible without departing from the various embodiments of the inventive concept disclosed herein.

Figure 5A:
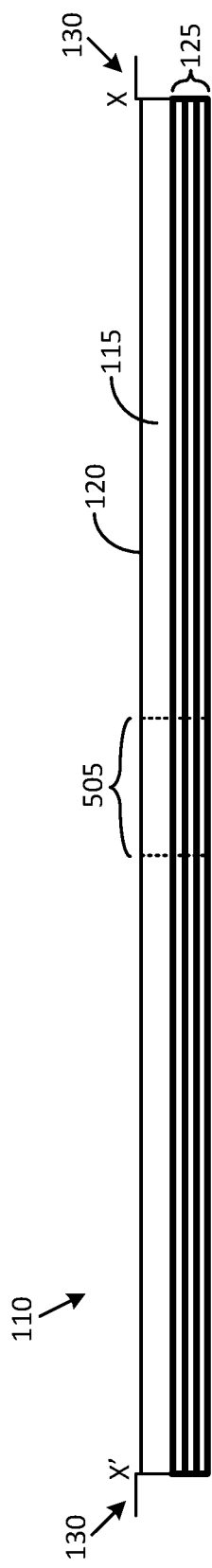
FIG. 5A illustrates still another example cross sectional view taken along X'-X of the big mass battery including the manufactured pressure vessel of FIG. 1.
Figure 5B:
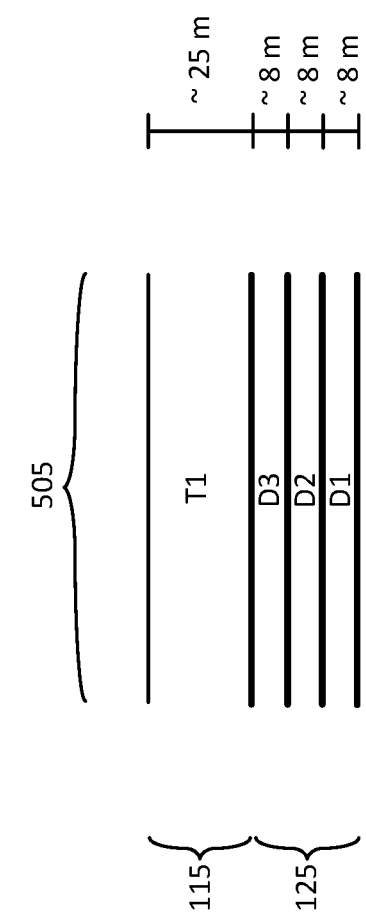
FIG. 5B illustrates a close-up view of a section of the cross sectional view of FIG. 5A.

FIG. 5A illustrates still another example cross sectional view taken along X'-X of the big mass battery 110 including the manufactured pressure vessel 125 of FIG. 1. FIG. 5B illustrates a close-up view of a section 505 of the cross sectional view of FIG. 5A. Reference is now made to FIGS. 5A and 5B, designated herein as Strip Mine C. Some of the elements are described above, and thus, a detailed description of such elements is not repeated.

The pressure vessel 125 shown in FIGS. 5A and 5B includes three pressure cells D1, D2, and D3. Each of the pressure cells (e.g., D1, D2, and D3) is isolated from the other. In other words, the fluid (e.g., air, water, or the like) is contained within each individual impermeable pressure cell (e.g., D1, D2, and D3). Each of the pressure cells (e.g., D1, D2, and D3) of the pressure vessel 125 can also contain porous earthen materials such as sand, gravel, stones, or the like, within which the fluid (e.g., air, water, or the like) can permeate. The lower-situated pressure cell D1 can include the interface section 140 (of FIG. 1) through which the fluid (e.g., air, water, or the like) can enter and exit the pressure vessel 125 via the one or more pressure lines (e.g., 142 and 144 of FIG. 1). The pressure cells D2 and D3 can also each include an interface section 140 (of FIG. 1), which can primarily be used to pressurize the pressure cells D2 and D3. The mine overburden 115 is shown as a layer T1.

In the close-up view of the section 505 of the cross sectional view of the big mass battery 110, four layers (e.g., D1, D2, D3, and T1) are shown. For example, layer T1 corresponds to the mine overburden 115, which pressurizes the manufactured pressure vessel 125 due to the weight of the mine overburden 115 by way of gravity. Layer D1 corresponds to a first pressure cell of the manufactured pressure vessel 125. Layer D2 corresponds to a second pressure cell of the manufactured pressure vessel 125. Layer D3 corresponds to a third pressure cell of the manufactured pressure vessel 125. In other words, in this example embodiment, the manufactured pressure vessel 125 includes three separate pressure cells. The bold lines shown in FIGS. 5A and 5B represent pressure cell boundaries of the manufactured pressure vessel 125.

In some embodiments, the mine overburden layer T1 is about twenty-five (25) meters in depth, the upper pressure cell D3 is about eight (8) meters in depth, the middle pressure cell D2 is about eight (8) meters in depth, and the lower-situated pressure cell D1 is about eight (8) meters in depth. It will be understood that other suitable dimensions are possible without departing from the various embodiments of the inventive concept disclosed herein.

Figure 6A:
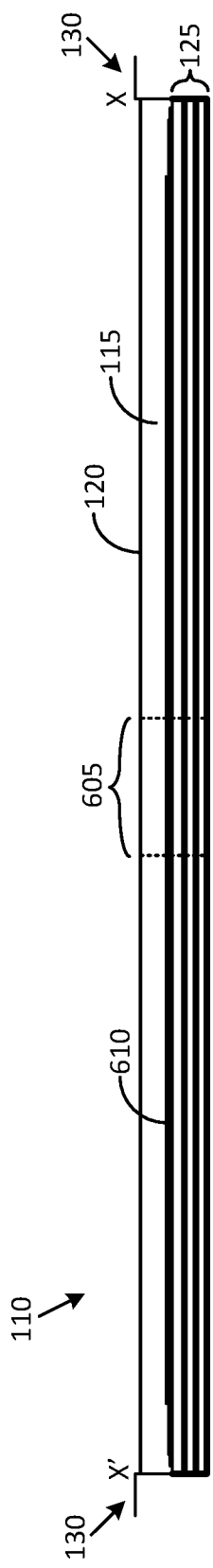
FIG. 6A illustrates another example cross sectional view taken along X'-X of the big mass battery including the manufactured pressure vessel of FIG. 1.
Figure 6B:
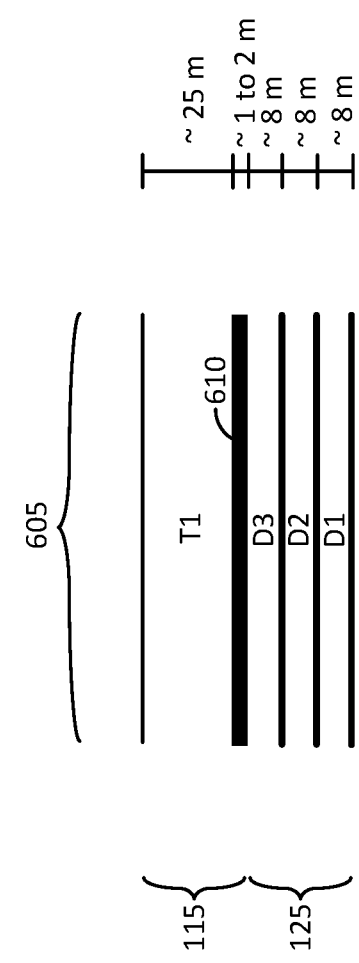
FIG. 6B illustrates a close-up view of a section of the cross sectional view of FIG. 6A.

FIG. 6A illustrates another example cross sectional view taken along X'-X of the big mass battery 110 including the manufactured pressure vessel 125 of FIG. 1. FIG. 6B illustrates a close-up view of a section 650 of the manufactured pressure vessel 125 of the cross sectional view of FIG. 6A. Reference is now made to FIGS. 6A and 6B, designated herein as Strip Mine D/E. Some of the elements are described above, and thus, a detailed description of such elements is not repeated.

The pressure vessel 125 shown in FIGS. 6A and 6B shows a bloated portion 610 of the manufactured pressure vessel 125. In other words, the manufactured pressure vessel 125 can lift the mine overburden layer T1. The amount of lift can be about one (1) meter in the case of Strip Mine D, and about two (2) meters in the case of Strip Mine E. The structural elements of the big mass battery 110 for both of the Strip Mine D and the Strip Mine E examples are otherwise essentially the same, and both are referred to in this example embodiment. The lift can be caused by additional volume of the fluid (e.g., air, water, or the like) added to one or more of the pressure cells (e.g., D1, D2, and D3) of the pressure vessel 125. The added volume to the pressure vessel 125 can cause the bloat 610, which lifts the mine overburden layer T1, thereby increasing the energy storage capacity of the big mass battery 110, as energy storage capacity is proportional to the volume of the pressure vessel 125.

Figure 7:
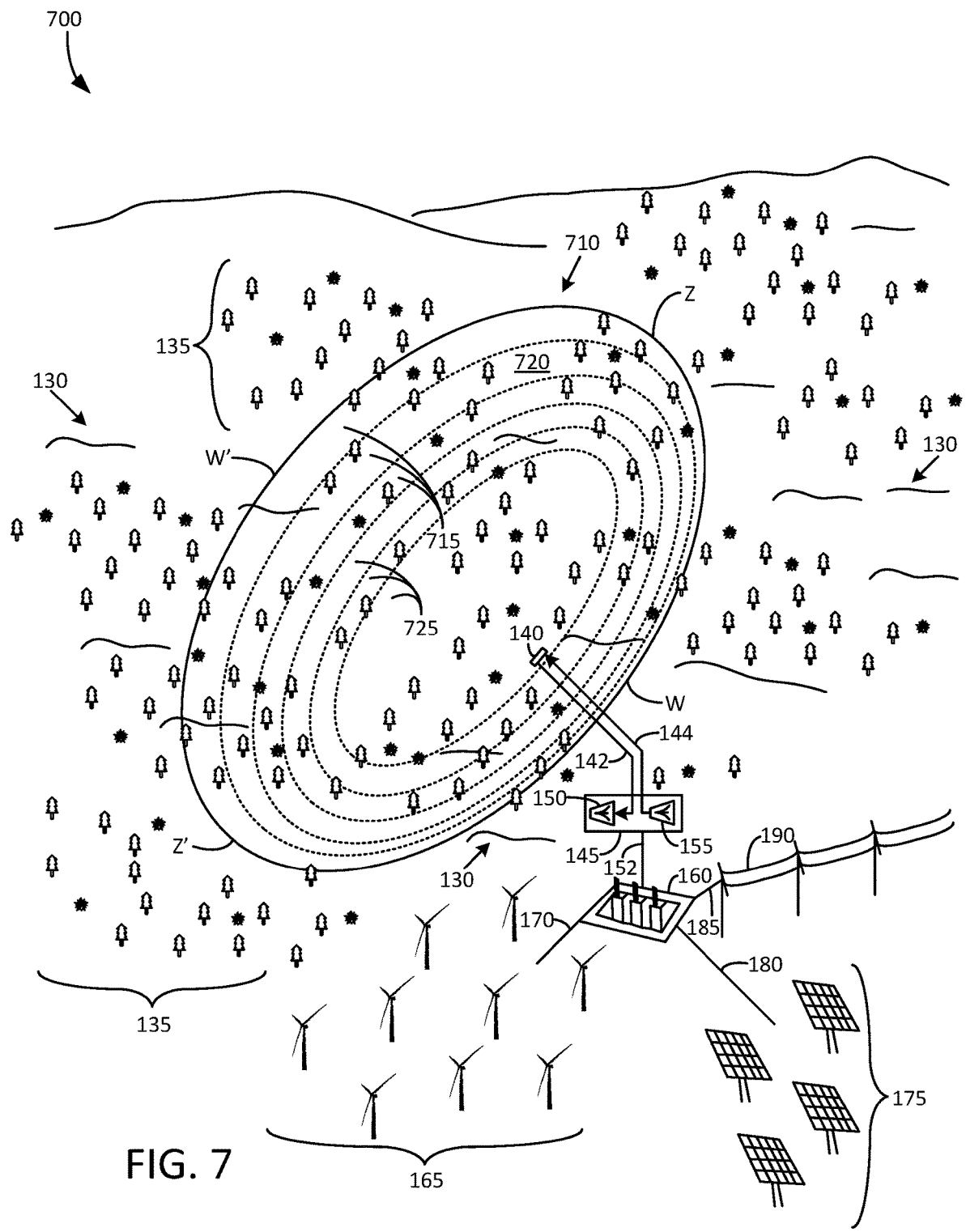
FIG. 7 illustrates an example perspective view of a big mass battery system including a big mass battery and a manufactured pressure vessel for energy storage, built in the vicinity of an open pit mine, in accordance with various embodiments of the inventive concept.

FIG. 7 illustrates an example perspective view of a big mass battery system 700 including a big mass battery 710 and a manufactured pressure vessel 725 for energy storage, built in the vicinity of an open pit mine, in accordance with various embodiments of the inventive concept. The big mass battery 710 includes mine waste rock 715 disposed atop the manufactured pressure vessel 725.

Large open pit mines tend to be deeper than large coal strip mines, but they tend to cover a lesser map area. Some embodiments of the inventive concept take advantage of big mass in transit at an open pit mine, re-directing the big mass for use as a part of a manufactured big mass pressure vessel. Constructing a big mass pressure vessel using big mass already in transit significantly lowers the costs of building a big mass battery device because some or all of the energy, labor, and treasure required to move the big mass to build the big mass battery device are being spent anyway. In some situations, big mass is not currently in transit but instead in temporary or permanent storage. These sites pose huge clean-up challenges. Big mass batteries as disclosed herein can offer a previously unavailable incentive to re-fill the open pits using the big mass composed of mine waste rock withdrawn from the pit to isolate the various pollution sources at the sites. Open pit mine big mass battery devices can yield higher energy density continuous for a year values relative to strip mine big mass battery devices due to the possible high depth and quantity of the mine waste rock.

General edge boundaries of the big mass battery 710 are indicated by W', W, Z', and Z designators. The big mass battery 710 can occupy the open pit mine. The upper surface 720 of the mine waste rock 715 can be remediated. For example, trees and vegetation (e.g., 135) can be planted to grow on the remediated surface 720, farmland cultivated, grazing areas established, or the like. The upper surface 720 of the mine waste rock 715 can be substantially coplanar with a surface 130 of the surrounding terrain. Walls of the manufactured pressure vessel 725 can include a substantially impermeable layer that is capable of substantially containing a fluid such as compressed air, water, or the like. For example, the impermeable layer of the walls of the manufactured pressure vessel 725 can be constructed of rubber. The rubber material can be recycled rubber, for example, from discarded rubber tires. The manufactured pressure vessel 725 can also contain porous earthen materials such as sand, gravel, stones, or the like, within which the fluid (e.g., air, water, or the like) can permeate. In some embodiments, the big mass battery 710 is substantially circular with a diameter of about 1600 meters long and has a depth of about 300 meters. It will be understood that other suitable dimensions are possible without departing from the various embodiments of the inventive concept disclosed herein.

Gravity can cause the mine waste rock 715 to apply pressure to the pressure vessel 725. The pressure vessel 725 can include an interface section 140 through which the fluid (e.g., air, water, or the like) can enter and exit the pressure vessel 725 via one or more pressure lines (e.g., 142 and 144). For example, the fluid can enter the pressure vessel 725 via pressure line 144 and/or exit the pressure vessel 725 via pressure line 142. The pressure lines (e.g., 142 and 144) can include a pipe, a hose, a tunnel, or the like. In some embodiments, a single pressure line can be used through which the fluid can both enter and exit the pressure vessel 725. The pressure lines (e.g., 142 and 144) can be connected to a turbine center 145. The turbine center 145 can include one or more turbines (e.g., 150 and 155). The one or more turbines (e.g., 150 and 155) can generate electricity by way of pressurized fluid received via the one or more pressure lines (e.g., 142 and 144). Alternatively or in addition, the one or more turbines (e.g., 150 and 155) can pump fluid into the pressurized vessel 725 via the one or more pressure lines (e.g., 142 and 144).

The turbine center 145 can be connected to a power station 160 via electrical line 152. The electrical line 152 can be, for example, an electrical cable. The turbine center 145 can provide electricity to the power station 160 via the electrical line 152. In some embodiments, the turbine center 145 can draw electricity from the power station 160 via the electrical line 152. The power station 160 can be connected to a wind farm 165 via electrical line 170, and/or to a solar farm 175 via electrical line 180. The power station 160 can receive electricity from the wind farm 165 via the electrical line 170, and/or from the solar farm 175 via the electrical line 180. The power station 160 can provide electricity to the electrical grid via an electrical line 185 and power grid lines 190, and/or receive electricity from the electrical grid via the electrical line 185 and the power grid lines 190.

During off-peak times, or when the power station 160 otherwise receives electricity from the wind farm 165, the solar farm 175, and/or the power grid lines 190, that is more than can be immediately accommodated or transferred to the grid, the power station 160 can send the excess electricity to the turbine center 145 via the electrical line 152. The turbine center 145 can then pump the fluid (e.g., air, water, or the like) into the pressure vessel 725 via the one or more pressure lines (e.g., 142 and 144), which provides gravity and pressure-based energy storage on a massive scale.

Figure 8:
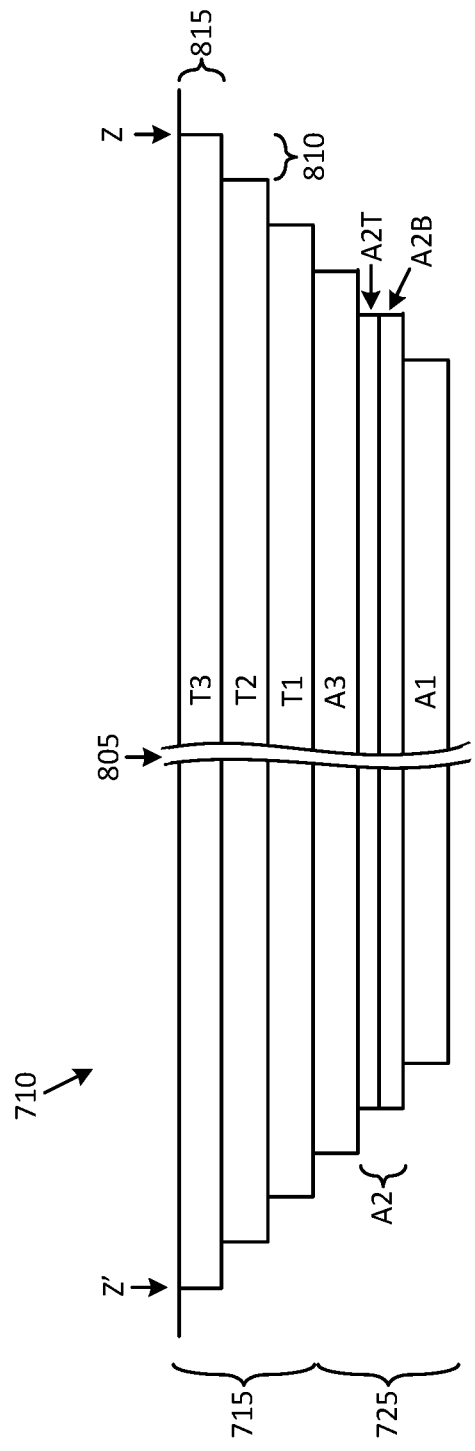
FIG. 8 illustrates an example cross sectional view taken along Z'-Z of the big mass battery including the manufactured pressure vessel of FIG. 7.

FIG. 8 illustrates an example cross sectional view taken along Z'-Z of the big mass battery 710 including the manufactured pressure vessel 725 of the big mass battery 710 of FIG. 7. Some of the elements are described above, and thus, a detailed description of such elements is not repeated. The dimensional break 805 represents a conceptual break in the length of the big mass battery 710. In other words, there is no actual physical break or physical item shown by 805.

The big mass battery 710 can include various layers. For example, layers T1, T2, and T3 correspond to the mine waste rock 715, which pressurizes the manufactured pressure vessel 725 due to the weight of the mine waste rock 715 by way of gravity. Layers A1, A2 divided into sub-layers A2B and A2T, and A3 correspond to the manufactured pressure vessel 725. More specifically, layers A1, A2 divided into sub-layers A2B and A2T, and A3 correspond to porous medium parts of the manufactured pressure vessel 725. The porous medium parts A1, A2 divided into sub-layers A2B and A2T, and A3 can contain an earthen material, a spongy material, and/or mineral processing waste. For example, the porous medium part A2B can contain an interior material or mix of materials having a first type, and the porous medium part A2T can contain an interior material or mix of materials having a second type.

The various layers and sub-layers (e.g., A1, A2, and A3) or the combinations of layers and/or sub-layers (e.g., A1 plus A2 plus A3) of the manufactured pressure vessel 725 can be self-contained pressure cells, as further described below. The internal pressure of a particular layer is dependent on the number and kind of layers above the particular layer. For example, the layer A1 has an internal pressure greater than each of the layers A2 and A3, and the layer A2 has an internal pressure greater than the layer A3. Consequently, the layer A1 can store more energy per unit volume of interconnected pore space than each of the layers A2 and A3, and the layer A2 can store more energy per unit volume of interconnected pore space than the layer A3. In some embodiments, each of the layers of the big mass battery 710 (i.e., A1, A2, A3, T1, T2, and T3) is about fifty (50) meters in depth, as shown for example by 815. Each concentric layer (e.g., 815) of the big mass battery 710 can extend about fifty (50) meters outwardly relative to an edge of the next layer, as shown at 810. It will be understood that other suitable dimensions are possible without departing from the various embodiments of the inventive concept disclosed herein.

Figure 9:
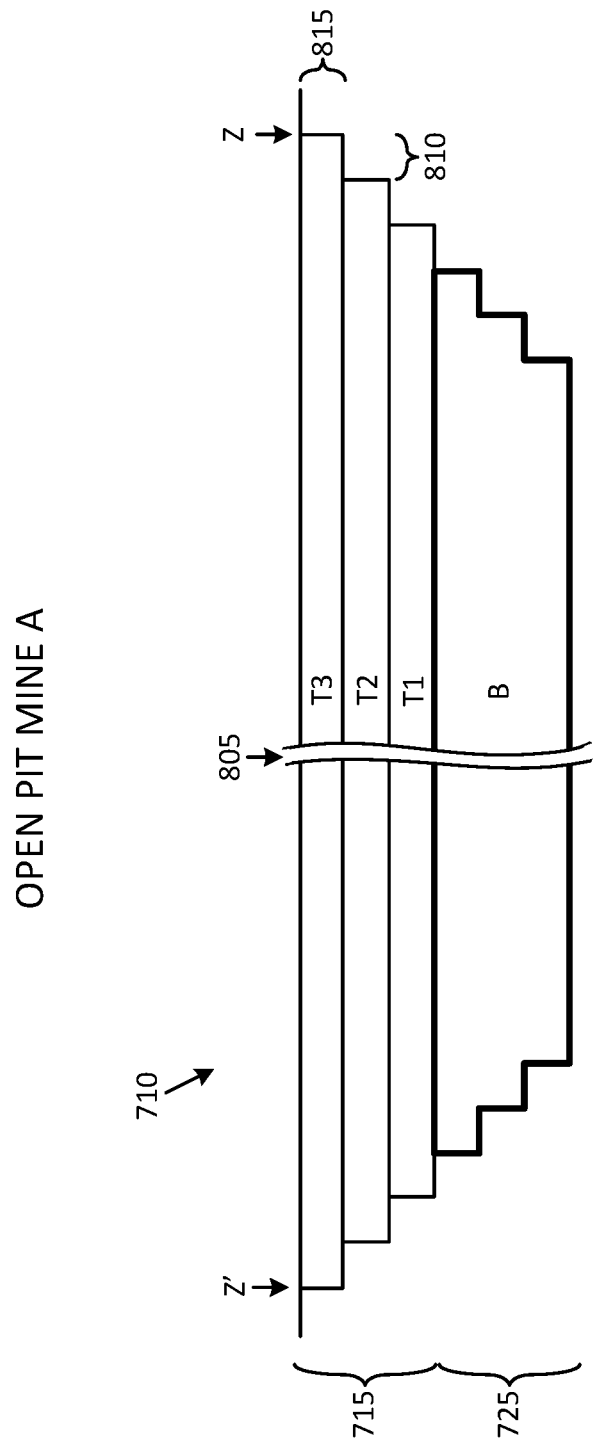
FIG. 9 illustrates another example cross sectional view taken along Z'-Z of the big mass battery including the manufactured pressure vessel of FIG. 7.

FIG. 9 illustrates another example cross sectional view taken along Z'-Z of the big mass battery 710 including the manufactured pressure vessel 725 of FIG. 7. The example embodiment of FIG. 9 is designated herein as Open Pit Mine A. Some of the elements are described above, and thus, a detailed description of such elements is not repeated. The dimensional break 805 represents a conceptual break in the length of the big mass battery 710. In other words, there is no actual physical break or physical item shown by 805.

The pressure vessel 725 shown in FIG. 9 includes a single pressure cell B. In other words, the fluid (e.g., air, water, or the like) is contained within the single pressure cell B. The single pressure cell B can also contain porous earthen materials such as sand, gravel, stones, or the like, within which the fluid (e.g., air, water, or the like) can permeate. The single pressure cell B can have stepped side walls. In other words, a lower portion of the pressure cell B can have a first diameter, the middle portion of the pressure cell B can have a second diameter greater than the first diameter, and an upper portion of the pressure cell B can have a third diameter greater than the second diameter. The single pressure cell B can include the interface section 140 (of FIG. 1) through which the fluid (e.g., air, water, or the like) can enter and exit the pressure vessel 725 via the one or more pressure lines (e.g., 142 and 144 of FIG. 1). The mine waste rock 715 is shown as layers T1, T2, and T3. The bold lines shown in FIG. 9 represent pressure cell boundaries of the manufactured pressure vessel 725.

In some embodiments, the mine waste rock layer T1 is about fifty (50) meters in depth as shown at 815, the mine waste rock layer T2 is about fifty (50) meters in depth, the mine waste rock layer T3 is about fifty (50) meters in depth, and the single pressure cell B of the pressure vessel 725 is about 150 meters in depth. Each concentric layer (e.g., 815) of the big mass battery 710 can extend about fifty (50) meters outwardly relative to an edge of the next layer, as shown at 810. It will be understood that other suitable dimensions are possible without departing from the various embodiments of the inventive concept disclosed herein.

Figure 10:
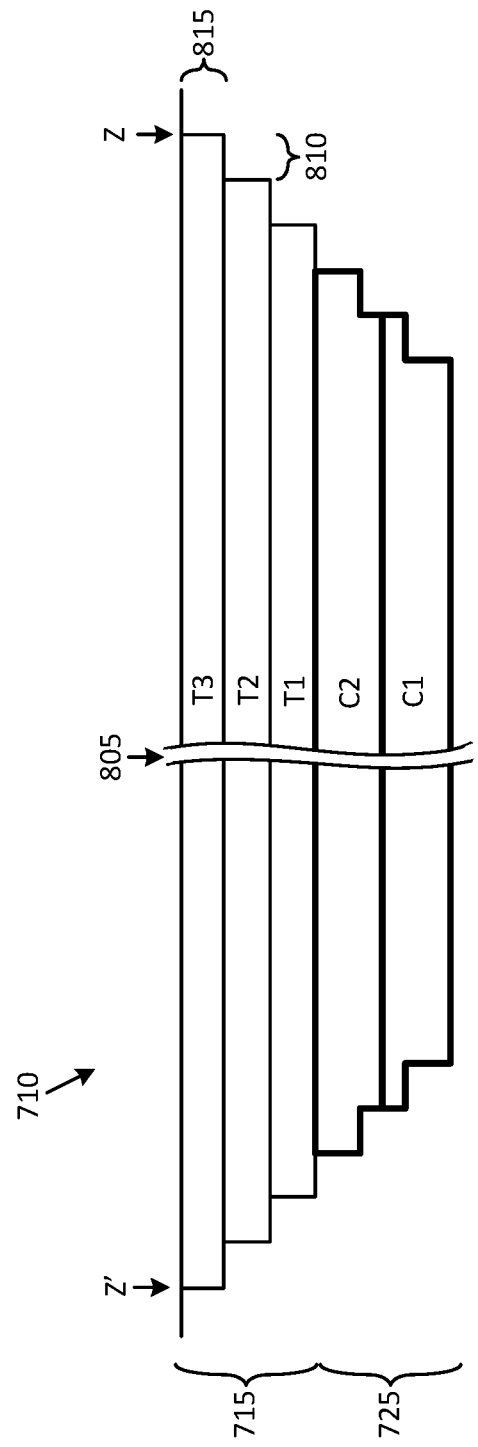
FIG. 10 illustrates yet another example cross sectional view taken along Z'-Z of the big mass battery including the manufactured pressure vessel of FIG. 7.

FIG. 10 illustrates yet another example cross sectional view taken along Z'-Z of the big mass battery 710 including the manufactured pressure vessel 725 of FIG. 7. The example embodiment of FIG. 10 is designated herein as Open Pit Mine B. Some of the elements are described above, and thus, a detailed description of such elements is not repeated. The dimensional break 805 represents a conceptual break in the length of the big mass battery 710. In other words, there is no actual physical break or physical item shown by 805.

The pressure vessel 725 shown in FIG. 10 includes two pressure cells C1 and C2. Each of the pressure cells (e.g., C1 and C2) is isolated from the other. In other words, the fluid (e.g., air, water, or the like) is contained within each individual impermeable pressure cell (e.g., C1 and C2). Each of the pressure cells (e.g., C1 and C2) of the pressure vessel 725 can also contain porous earthen materials such as sand, gravel, stones, or the like, within which the fluid (e.g., air, water, or the like) can permeate. The pressure cells C1 and C2 can have stepped side walls. In other words, a lower portion of the pressure cell C1 can have a first diameter, and an upper portion of the pressure cell C1 can have a second diameter greater than the first diameter. Similarly, a lower portion of the pressure cell C2 can have a first diameter, and an upper portion of the pressure cell C1 can have a second diameter greater than the first diameter.

The lower-situated pressure cell C1 can include the interface section 140 (of FIG. 1) through which the fluid (e.g., air, water, or the like) can enter and exit the pressure vessel 725 via the one or more pressure lines (e.g., 142 and 144 of FIG. 1). The pressure cell C2 can also include an interface section 140 (of FIG. 1), which can primarily be used to pressurize the pressure cell C2. The mine waste rock 715 is shown as layers T1, T2, and T3.

The big mass battery 710 can include five layers (e.g., C1, C2, T1, T2, and T3). For example, layer T1 corresponds to a first layer of the mine waste rock 715, layer T2 corresponds to a second layer of the mine waste rock 715, and layer T3 corresponds to a third layer of the mine waste rock 715, all of which pressurizes the manufactured pressure vessel 725 due to the weight of the mine waste rock 715 by way of gravity. Layer C1 corresponds to a first pressure cell of the manufactured pressure vessel 725. Layer C2 corresponds to a second pressure cell of the manufactured pressure vessel 725. In other words, in this example embodiment, the manufactured pressure vessel 725 includes two separate pressure cells. The bold lines shown in FIG. 10 represent pressure cell boundaries of the manufactured pressure vessel 725.

In some embodiments, the mine waste rock layer T1 is about fifty (50) meters in depth as shown at 815, the mine waste rock layer T2 is about fifty (50) meters in depth, the mine waste rock layer T3 is about fifty (50) meters in depth, the pressure cell C1 of the pressure vessel 725 is about seventy-five (75) meters in depth, and the pressure cell C2 of the pressure vessel 725 is about seventy-five (75) meters in depth. Each concentric layer (e.g., 815) of the big mass battery 710 can extend about fifty (50) meters outwardly relative to an edge of the next layer, as shown at 810. It will be understood that other suitable dimensions are possible without departing from the various embodiments of the inventive concept disclosed herein.

Figure 11:
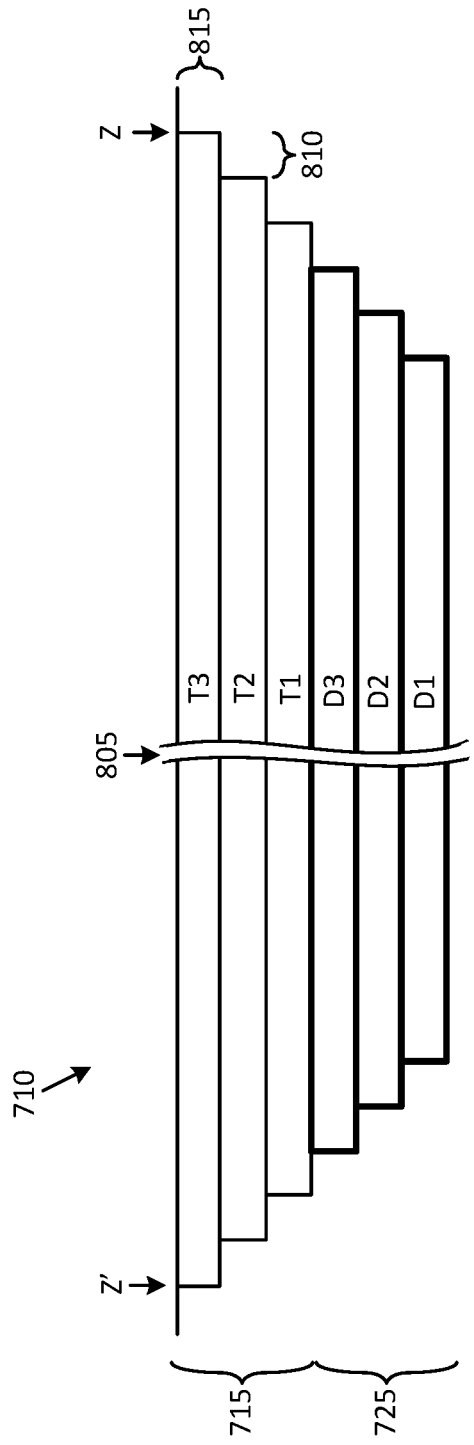
FIG. 11 illustrates still another example cross sectional view taken along Z'-Z of the big mass battery including the manufactured pressure vessel of FIG. 7.

FIG. 11 illustrates still another example cross sectional view taken along Z'-Z of the big mass battery including the manufactured pressure vessel 725 of FIG. 7. The example embodiment of FIG. 11 is designated herein as Open Pit Mine C. Some of the elements are described above, and thus, a detailed description of such elements is not repeated. The dimensional break 805 represents a conceptual break in the length of the big mass battery 710. In other words, there is no actual physical break or physical item shown by 805.

The pressure vessel 725 shown in FIG. 11 includes three pressure cells D1, D2, and D3. Each of the pressure cells (e.g., D1, D2, and D3) is isolated from the other. In other words, the fluid (e.g., air, water, or the like) is contained within each individual impermeable pressure cell (e.g., D1, D2, and D3). Each of the pressure cells (e.g., D1, D2, and D3) of the pressure vessel 725 can also contain porous earthen materials such as sand, gravel, stones, or the like, within which the fluid (e.g., air, water, or the like) can permeate. The pressure cell D1 can have a first diameter. The pressure cell D2 can have a second diameter greater than the first diameter. The pressure cell D3 can have a third diameter greater than the second diameter.

The lower-situated pressure cell D1 can include the interface section 140 (of FIG. 1) through which the fluid (e.g., air, water, or the like) can enter and exit the pressure vessel 725 via the one or more pressure lines (e.g., 142 and 144 of FIG. 1). The pressure cells D2 and D3 can also each include an interface section 140 (of FIG. 1), which can primarily be used to pressurize the pressure cells D2 and D3. The mine waste rock 715 is shown as layers T1, T2, and T3.

The big mass battery 710 can include six layers (e.g., D1, D2, D3, T1, T2, and T3). For example, layer T1 corresponds to a first layer of the mine waste rock 715, layer T2 corresponds to a second layer of the mine waste rock 715, and layer T3 corresponds to a third layer of the mine waste rock 715, all of which pressurizes the manufactured pressure vessel 725 due to the weight of the mine waste rock 715 by way of gravity. Layer D1 corresponds to a first pressure cell of the manufactured pressure vessel 725, layer D2 corresponds to a second pressure cell of the manufactured pressure vessel 725, and layer D3 corresponds to a third pressure cell of the manufactured pressure vessel 725. In other words, in this example embodiment, the manufactured pressure vessel 725 includes three separate pressure cells. The bold lines shown in FIG. 11 represent pressure cell boundaries of the manufactured pressure vessel 725.

In some embodiments, the mine waste rock layer T1 is about fifty (50) meters in depth as shown at 815, the mine waste rock layer T2 is about fifty (50) meters in depth, the mine waste rock layer T3 is about fifty (50) meters in depth, the pressure cell D1 of the pressure vessel 725 is about fifty (50) meters in depth, the pressure cell D2 of the pressure vessel 725 is about fifty (50) meters in depth, and the pressure cell D3 of the pressure vessel 725 is about fifty (50) meters in depth. Each concentric layer (e.g., 815) of the big mass battery 710 can extend about fifty (50) meters outwardly relative to an edge of the next layer, as shown at 810. It will be understood that other suitable dimensions are possible without departing from the various embodiments of the inventive concept disclosed herein.

Figure 12:
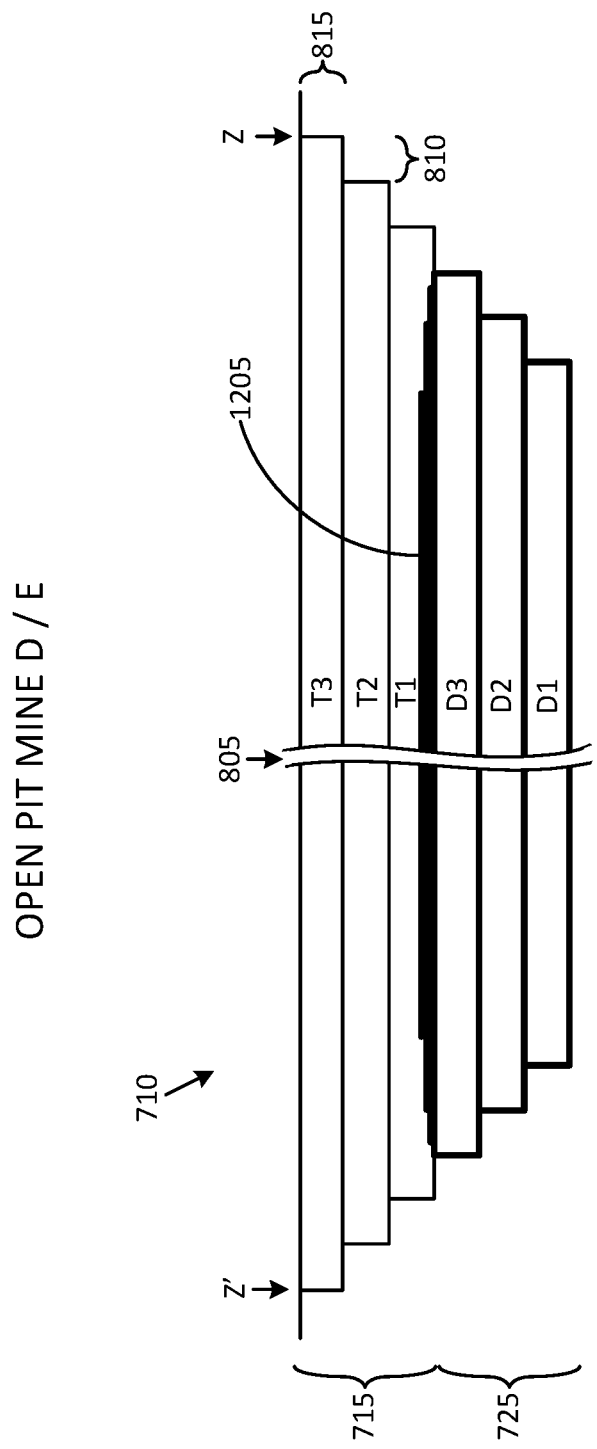
FIG. 12 illustrates still another example cross sectional view taken along Z'-Z of the big mass battery including the manufactured pressure vessel of FIG. 7.

FIG. 12 illustrates still another example cross sectional view taken along Z'-Z of the big mass battery 710 including the manufactured pressure vessel 725 of the big mass battery 710 of FIG. 7. The example embodiment of FIG. 12 is designated herein as Open Pit Mine D/E. Some of the elements are described above, and thus, a detailed description of such elements is not repeated. The dimensional break 805 represents a conceptual break in the length of the big mass battery 710. In other words, there is no actual physical break or physical item shown by 805.

The pressure vessel 725 shown in FIG. 12 shows a bloated portion 1205 of the manufactured pressure vessel 725. In other words, the manufactured pressure vessel 725 can lift the mine waste rock layers T1, T2, and/or T3. The amount of lift can be about five (5) meter in the case of Open Pit Mine D, and about ten (10) meters in the case of Open Pit Mine E. The structural elements of the big mass battery 710 for both of the Open Pit Mine D and the Open Pit Mine E examples are otherwise essentially the same, and both are referred to in this example embodiment. The lift can be caused by additional volume of the fluid (e.g., air, water, or the like) added to one or more of the pressure cells (e.g., D1, D2, and D3) of the pressure vessel 725. The added volume to the pressure vessel 725 can cause the bloat 1205, which lifts the mine waste rock layers T1, T2, or T3, thereby increasing energy storage capacity of the big mass battery 710, as energy storage capacity is proportional to the volume of the pressure vessel 725.

Figure 13:
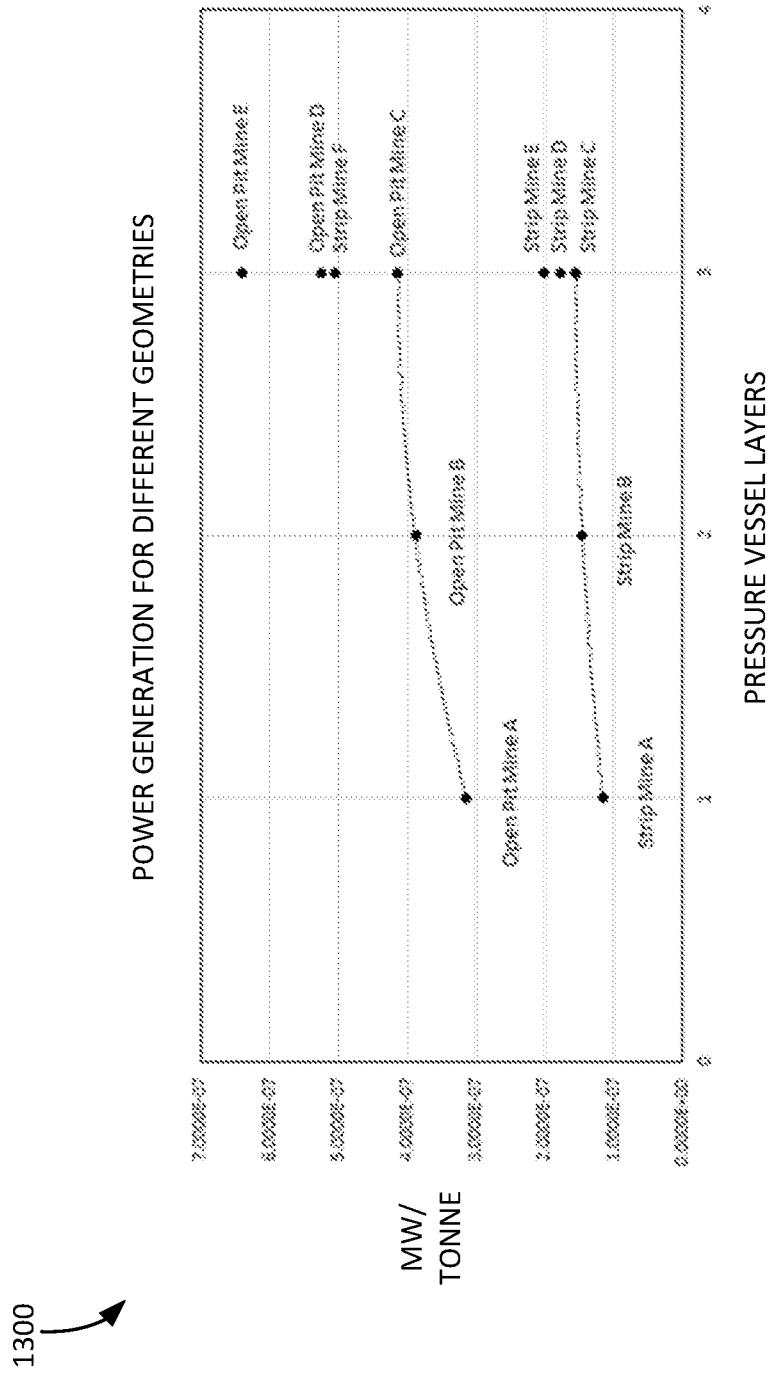
FIG. 13 is a graph showing approximate power generation figures for the big mass batteries of FIGS. 1 and 7.

FIG. 13 is a graph 1300 showing approximate power generation figures for different geometries of the big mass batteries 110 and 710 of FIGS. 1 and 7, respectively. Approximate MW/Tonne values are shown on the y-axis for each of Strip Mine examples A through E described in detail above, and for each of Open Pit Mine examples A through E also described in detail above. The number of pressure vessel layers is shown on the x-axis of the graph 1300.

Figure 14:
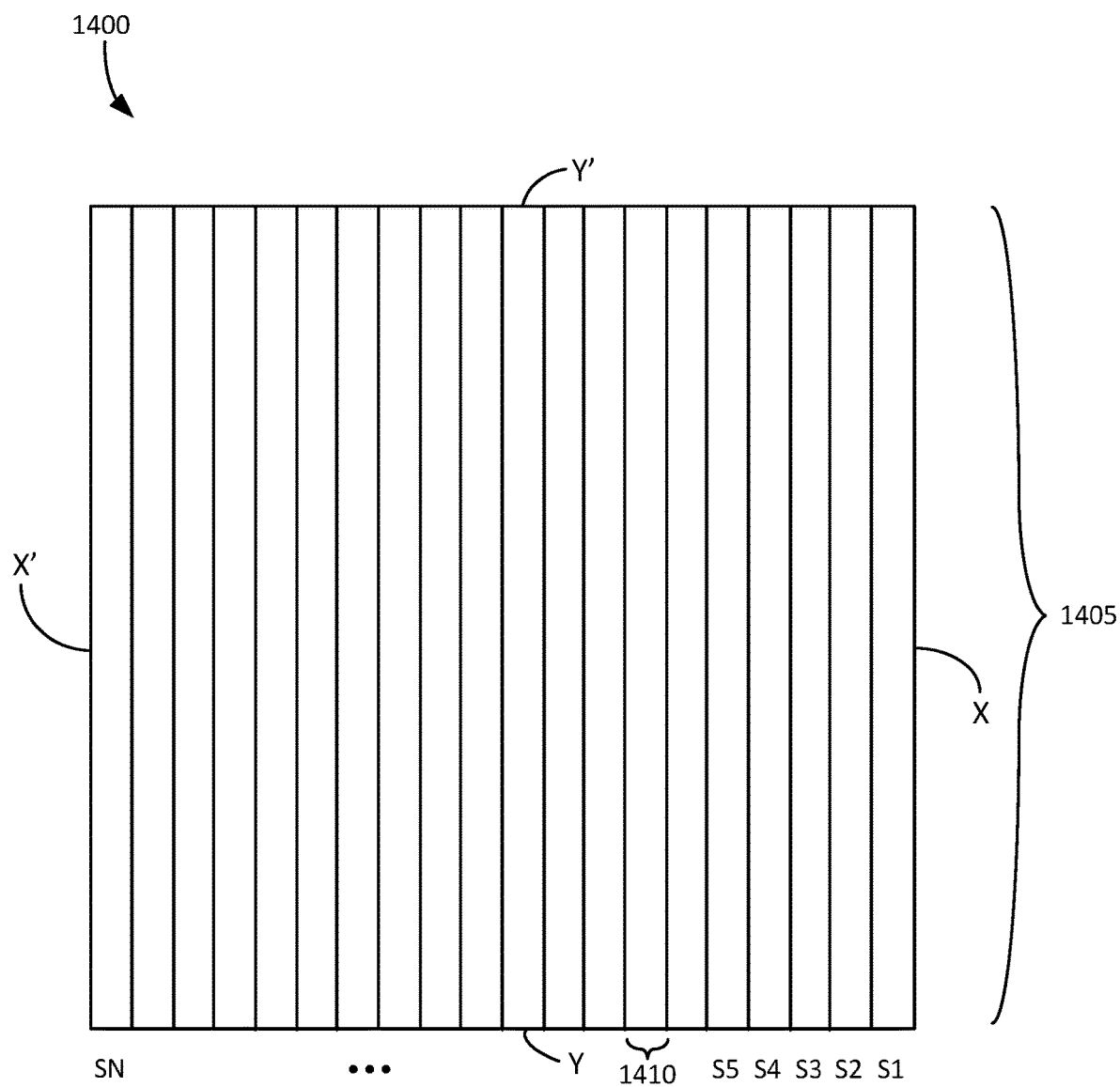
FIG. 14 illustrates an example plan view of a strip mine having multiple mining strips.

FIG. 14 illustrates an example plan view of a strip mine 1400 having multiple mining strips (e.g., labeled S1, S2, S3, S4, and S5, through SN). General edge boundaries of the strip mine 1400 are indicated by X', X, Y', and Y designators. In some embodiments, each mining strip is about one thousand (1000) meters long as shown at 1405 and fifty (50) meters wide as shown at 1410.

Some embodiments of the inventive concept take advantage of big mass in transit at an active coal strip mine, re-directing the big mass for use as a part of a manufactured big mass pressure vessel. Constructing a big mass pressure vessel using big mass already in transit significantly lowers the costs of building a big mass battery device because some or all of the energy, labor, and treasure required to move the big mass to build the big mass battery device are being spent anyway.

Figure 15:
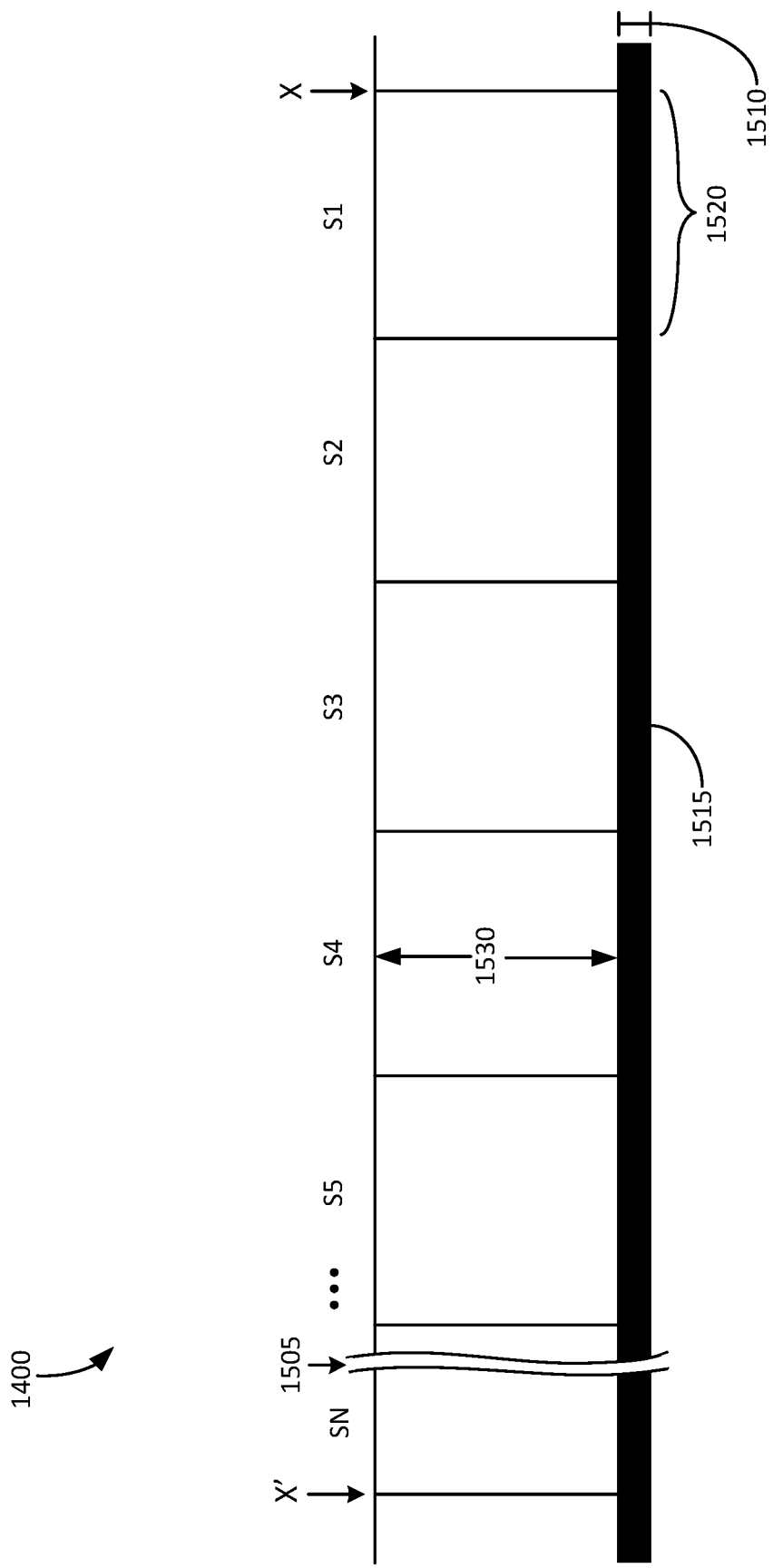
FIG. 15 illustrates an example cross sectional view taken along X'-X of the strip mine of FIG. 14 prior to the mining strips being mined.

FIG. 15 illustrates an example cross sectional view taken along X'-X of the strip mine 1400 of FIG. 14 prior to the mining strips (e.g., S1, S2, S3, S4, and S5, through SN) being mined. The dimensional break 1505 represents a conceptual break in the length of the strip mine 1400. In other words, there is no actual physical break or physical item shown by 1505.

A horizontal coal seam 1515 runs along the bottom of the strip mine 1400. The coal seam 1515 can have a depth 1510 of about six (6) meters, and each mining strip (e.g., S1, S2, S3, S4, S5, through SN) can have an overburden depth 1530 of about fifty (50) meters and a strip width 1520 of about fifty (50) meters, although it will be understood that other dimensions are possible without departing from the inventive concept disclosed herein.

Figure 16:
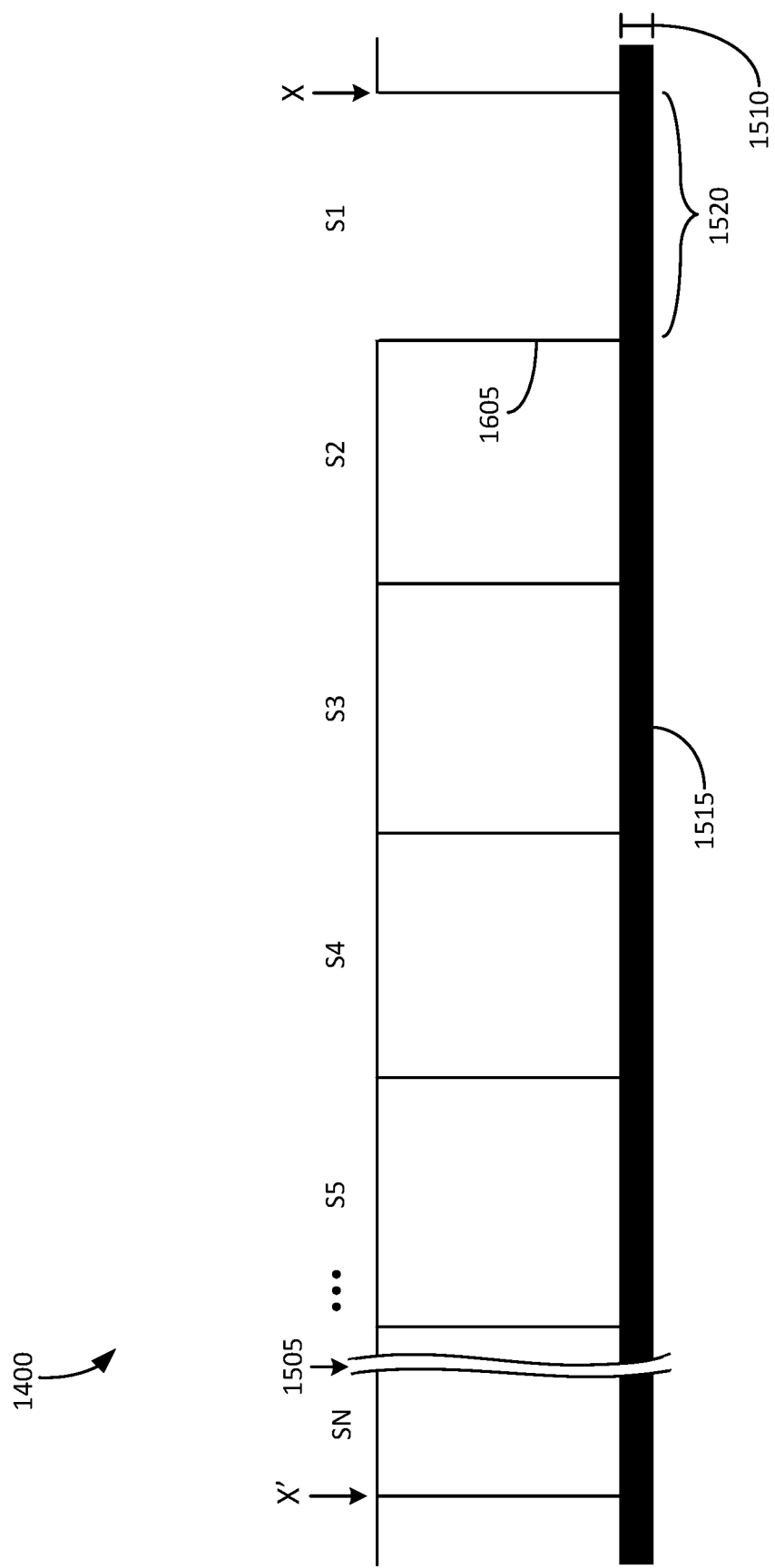
FIG. 16 illustrates an example cross section view taken along X'-X of the strip mine of FIG. 14 after mine overburden is removed in a mining strip from above a coal seam.

FIG. 16 illustrates an example cross section view taken along X'-X of the strip mine 1400 of FIG. 14 after mine overburden is removed in a mining strip S1 from above a coal seam 1515. Some of the elements are described above, and thus, a detailed description of such elements is not repeated. An active mining face 1605 is exposed after removing the mine overburden in the mining strip S1.

Figure 17:
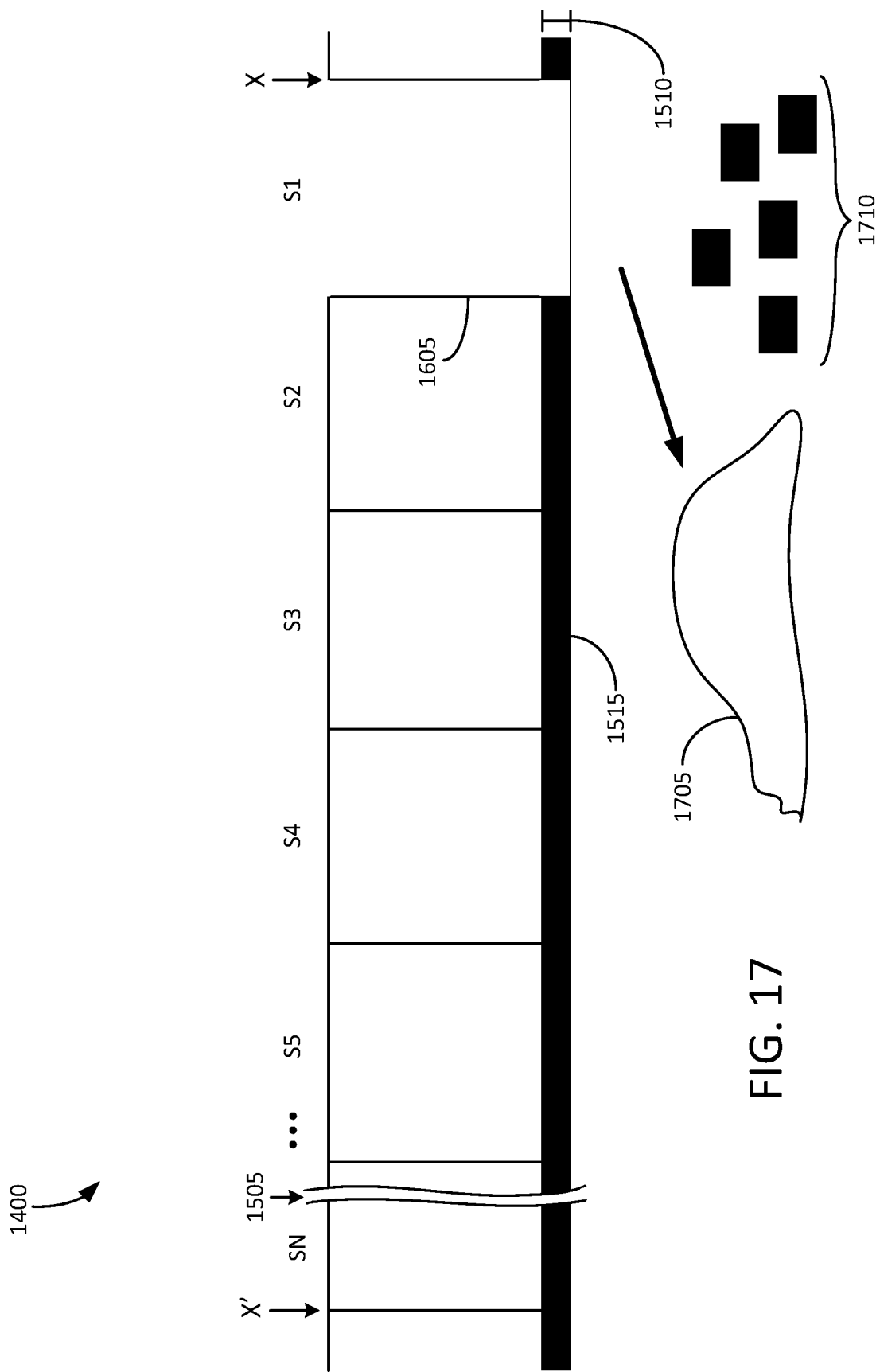
FIG. 17 illustrates an example cross section view taken along X'-X of the strip mine of FIG. 14 after coal is removed in the mining strip from the coal seam.

FIG. 17 illustrates an example cross section view taken along X'-X of the strip mine 1400 of FIG. 14 after coal 1710 is removed in the mining strip S1 from the coal seam 1515. Some of the elements are described above, and thus, a detailed description of such elements is not repeated. After mining the strip S1, broken overburden 1705 becomes big mass, which is removed from above the coal seam 1515, and stockpiled for later use. The coal 1710 that has been mined is sent into the economy.

Figure 18:
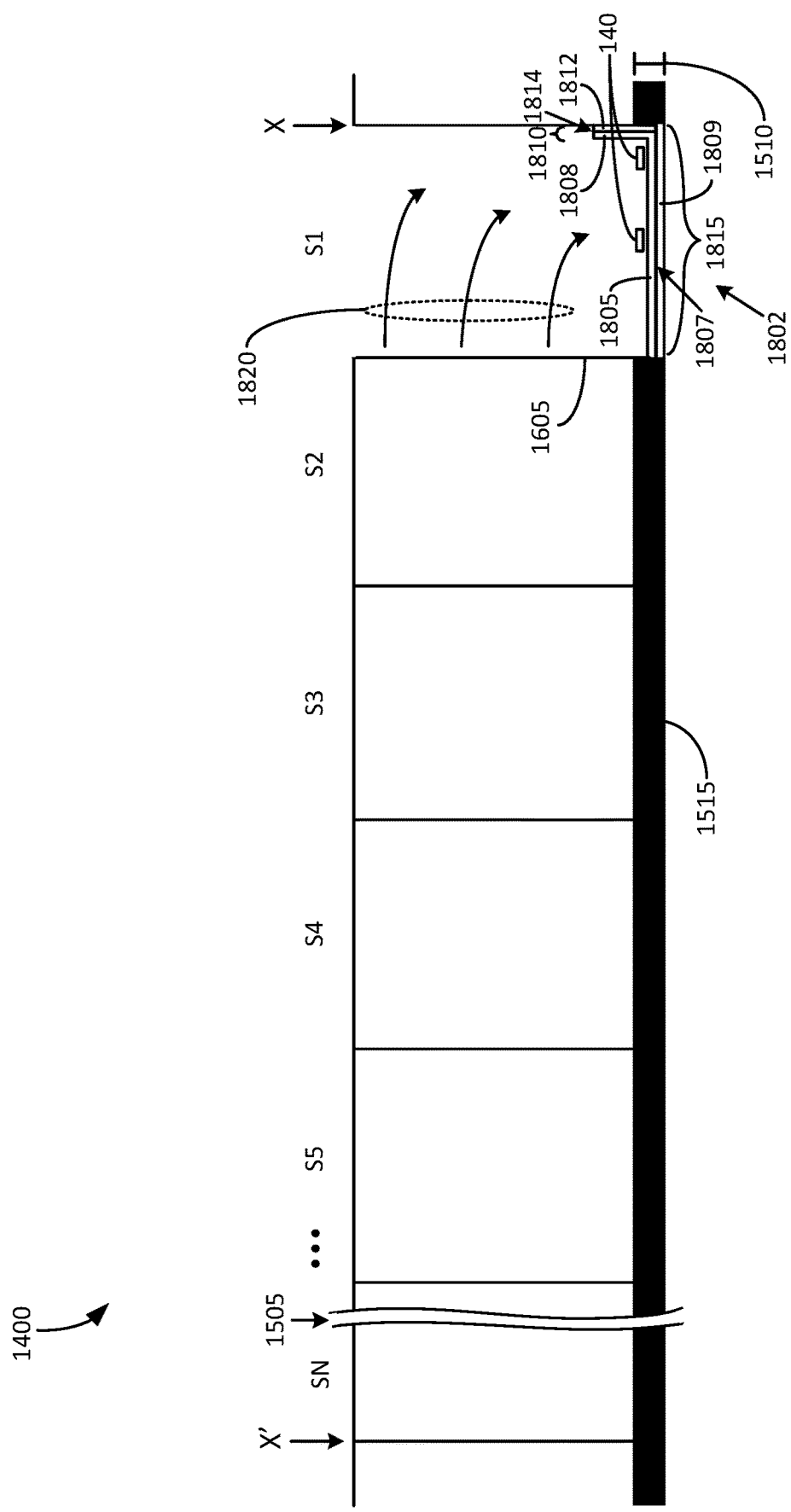
FIG. 18 illustrates an example cross section view taken along X'-X of the strip mine of FIG. 14 including a pressure cell bottom part and a pressure cell side part of a pressure vessel disposed in a mining strip in accordance with some embodiments of the inventive concept.

FIG. 18 illustrates an example cross section view taken along X'-X of the strip mine 1400 of FIG. 14 including a pressure cell 1802 having a pressure cell bottom part 1815 and a pressure cell side part 1810 of a pressure vessel disposed in a mining strip S1 in accordance with some embodiments of the inventive concept. Some of the elements are described above, and thus, a detailed description of such elements is not repeated.

The pressure cell bottom part 1815 can be constructed up to the active mining face 1605. The pressure cell bottom part 1815 can include a bottom part protective layer 1805, which can be composed of clay, sand, or other earthen material. The pressure cell bottom part 1815 can further include a bottom part seal 1807, which can be composed of an impermeable layer, such as rubber. The pressure cell bottom part 1815 can further include a bottom part protective layer 1809, which can be composed of clay, sand, or other earthen material.

The pressure cell side part 1810 can be constructed away from the active mining face 1605. In other words, the pressure cell side part 1810 can be constructed on an opposite end of the strip S1 relative to the active mining face 1605. The pressure cell side part 1810 can include a substantially vertical side part 1808, which can be composed of a geomembrane. The pressure cell side part 1810 can further include a substantially vertical side part seal 1814, which can be composed of an impermeable layer, such as rubber. The pressure cell side part 1810 can further include a cell side part 1812, which can be composed of a geomembrane. One or more interface sections 140 can be constructed above the pressure cell bottom part 1815 through which the fluid (e.g., air, water, or the like) can enter and exit the pressure vessel via the one or more pressure lines (e.g., 142 and 144 of FIG. 1). In some embodiments, each interface section 140 can include at least one of a fluid input interface, a fluid output interface, or a water drain interface. The interface can be, for example, a pipe, a hole, a continuous tube, a tunnel, a physical coupling, or the like.

After constructing the pressure cell bottom part 1815 and the pressure cell side part 1810, mining strip S2 can be cast blasted so that porous material such as the mine overburden 1820 can be deposited on the pressure cell bottom part 1815.

Figure 19:
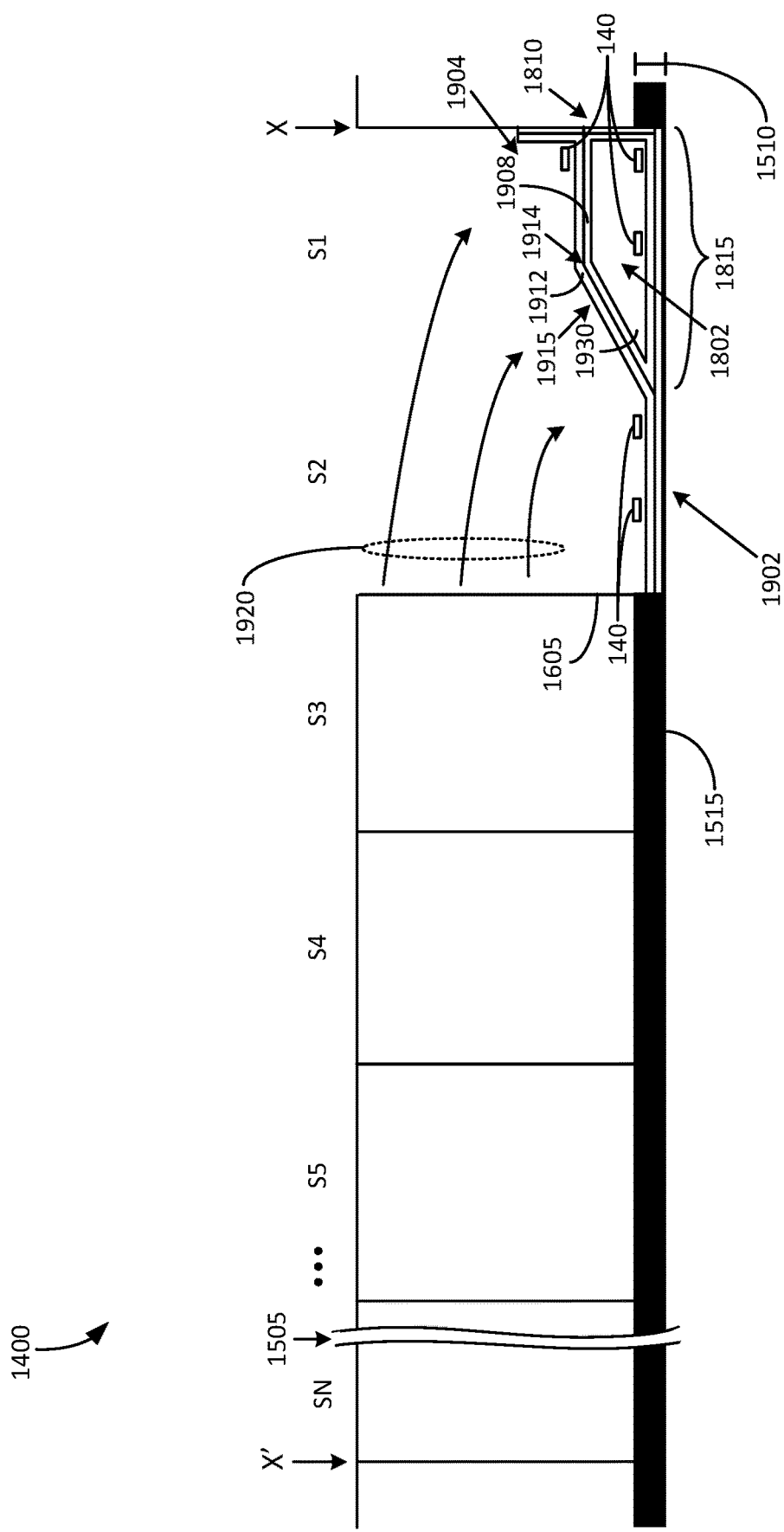
FIG. 19 illustrates another example cross section view taken along X'-X of the strip mine of FIG. 14 including additional parts of the pressure vessel disposed in two adjacent mining strips in accordance with some embodiments of the inventive concept.

FIG. 19 illustrates another example cross section view taken along X'-X of the strip mine 1400 of FIG. 14 including the completed pressure cell 1802 and additional parts of the pressure vessel disposed in two adjacent mining strips S1 and S2 in accordance with some embodiments of the inventive concept. Some of the elements are described above, and thus, a detailed description of such elements is not repeated.

The pressure cell 1802 can have an angle of repose 1930 of about 30 degrees, which is a natural and safe angle that occurs as a result of the cast blasting of the overburden (e.g., 1820 and 1920). The pressure cell 1802 can include a top part 1915, which can include the slanted portion due to the angle of repose 1930 and an upper flat portion, and can be connected to the pressure cell side part 1810 and the pressure cell bottom part 1815, over the porous overburden 1920 that was cast on the pressure cell bottom part 1815, to complete the enclosed pressure cell 1802. The pressure cell top part 1915 can include a top part protective layer 1912, which can be composed of clay, sand, or other earthen material. The pressure cell top part 1915 can further include a top part seal 1914, which can be composed of an impermeable layer, such as rubber. The pressure cell top part 1915 can further include a top part protective layer 1908, which can be composed of clay, sand, or other earthen material.

The pressure cell top part 1915 can serve as a pressure cell bottom part of another pressure cell to sit atop the pressure cell 1915, and so forth. The pressure cell top part 1915 can be constructed atop the interior overburden material (e.g., 1820) that was cast onto the pressure cell bottom part 1815 of the pressure cell 1802. The pressure cell bottom part 1815 of the pressure cell 1802 can be extended to the active mining face 1605 in preparation of constructing another pressure cell 1902. Similarly, the pressure cell side part 1810 of the pressure cell 1802 can be extended in an upward direction in preparation of constructing yet another pressure cell 1904. Thereafter, mining strip S3 can be cast blasted so that porous material such as the mine overburden 1920 can be deposited atop the pressure cell 1802, and atop the bottom part of the pressure cell 1902.

Figure 20:
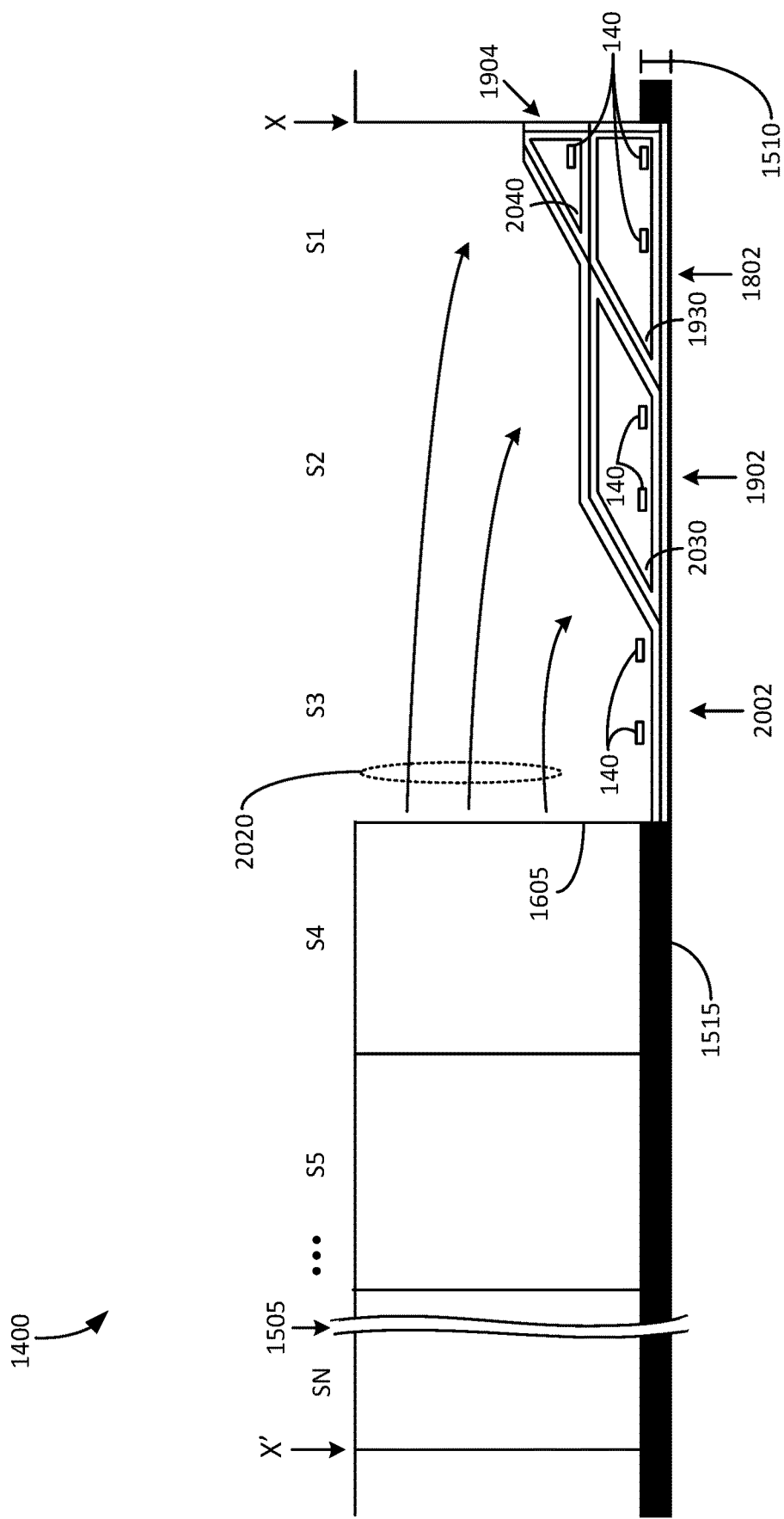
FIG. 20 illustrates another example cross section view taken along X'-X of the strip mine of FIG. 14 including additional parts of the pressure vessel disposed in three adjacent mining strips in accordance with some embodiments of the inventive concept.

FIG. 20 illustrates another example cross section view taken along X'-X of the strip mine 1400 of FIG. 14 including additional parts of the pressure vessel disposed in three adjacent mining strips (e.g., S1, S2, and S3) in accordance with some embodiments of the inventive concept. Some of the elements are described above, and thus, a detailed description of such elements is not repeated.

The construction of pressure cells 1902 and 1904 can be completed in a similar fashion to that of pressures cell 1802 as described in detail above. Notably, the pressure cell 1902 can be in substantially the shape of a rhombus due to the two angles of repose 1930 and 2030. The pressure cell 1904 can be in the shape of a triangle due to the angle of repose 2040 and the substantially vertical face of the mining strip S1. Each of the pressure cells 1802, 1902, and 1904 can include one or more interface sections 140, as described in detail above.

The pressure cell bottom part of the pressure cell 1902 can be extended to the active mining face 1605 in preparation of constructing still another pressure cell 2002. Thereafter, mining strip S4 can be cast blasted so that porous material such as the mine overburden 2020 can be deposited atop the pressure cells 1902 and 1904, and atop the bottom part of the pressure cell 2002.

Figure 21:
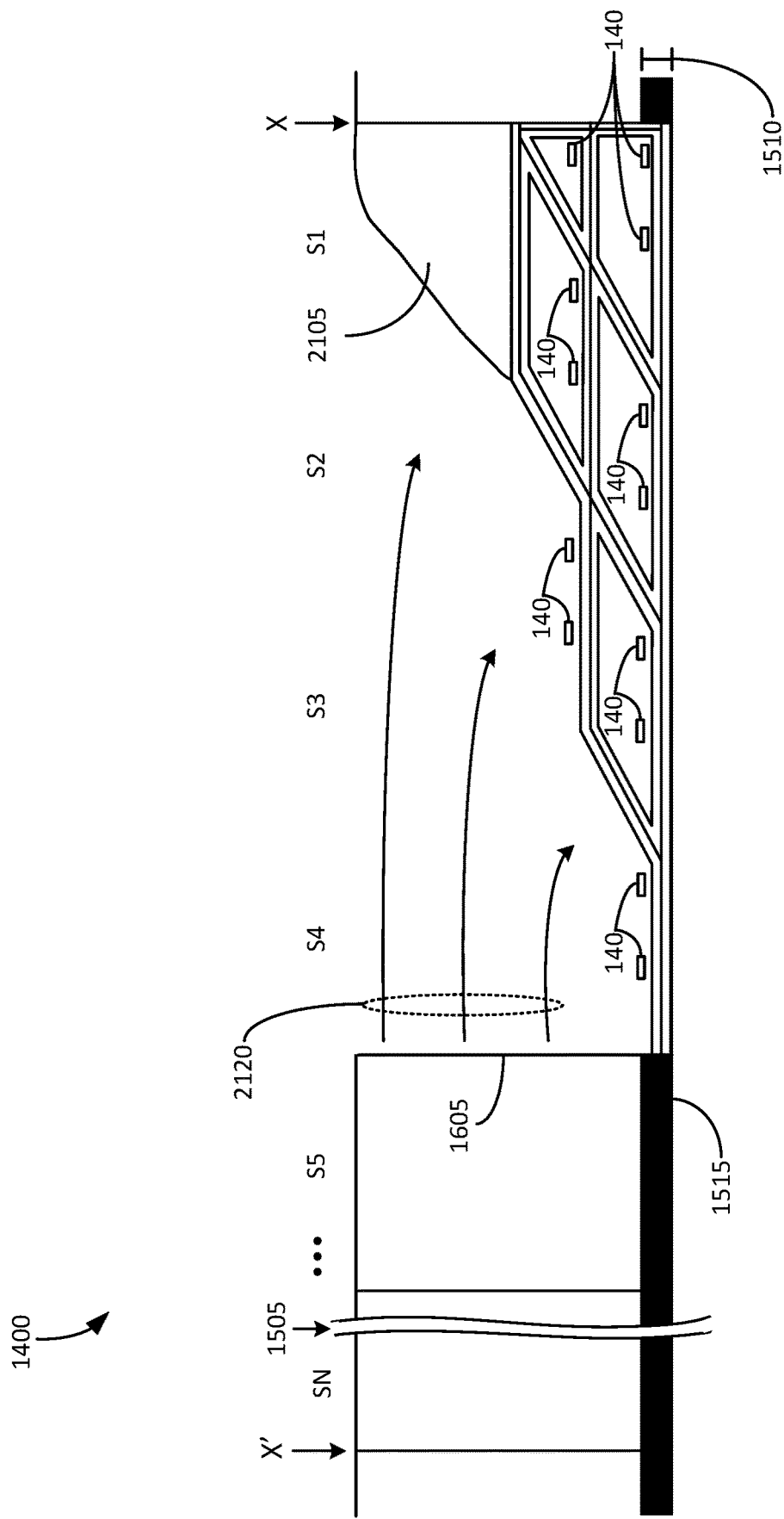
FIG. 21 illustrates another example cross section view taken along X'-X of the strip mine of FIG. 14 including additional parts of the pressure vessel disposed in four adjacent mining strips in accordance with some embodiments of the inventive concept.

FIG. 21 illustrates another example cross section view taken along X'-X of the strip mine 1400 of FIG. 14 including additional parts of the pressure vessel disposed in four adjacent mining strips (e.g., S1, S2, S3, and S4) in accordance with some embodiments of the inventive concept. The construction of pressure cells can proceed in a fashion similar to that described above with reference to FIGS. 18-20. The cast blasting of each mining strip is used not only to fill the pressure cells with porous mine overburden, but also to cast the broken overburden atop the pressure cells as shown at 2105. In other words, the overburden 2120 can be cast blast onto the parts of the pressure cells for two purposes: 1) to assist in the construction of the pressure cells, and 2) to build a layer of big mass overburden atop the pressure cells, which pressurizes the manufactured pressure vessel due to the weight of the mine overburden by way of gravity.

Figure 22:
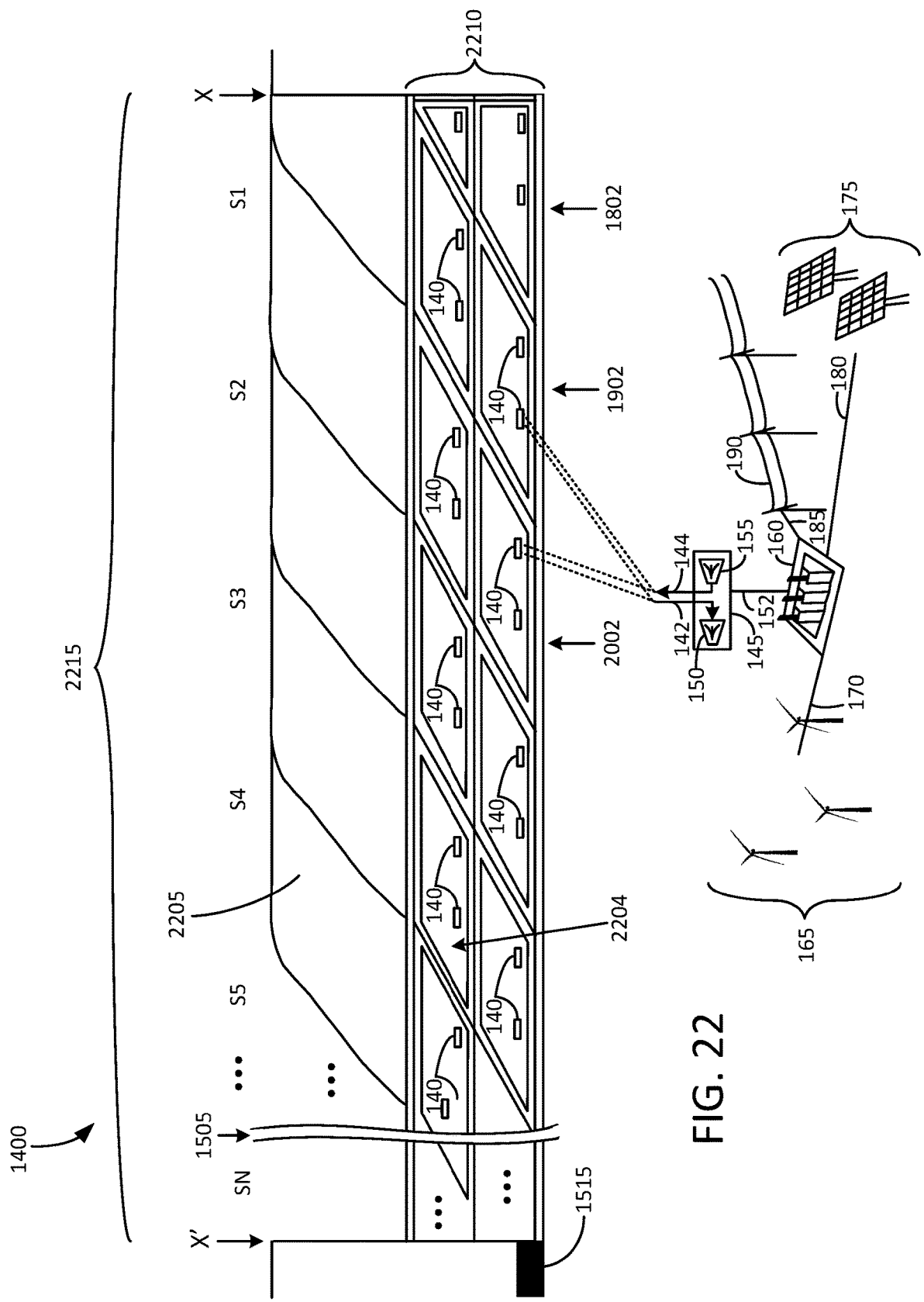
FIG. 22 illustrates another example cross section view taken along X'-X of the strip mine of FIG. 14 including additional parts of the pressure vessel disposed in all of the illustrated mining strips in accordance with some embodiments of the inventive concept.

FIG. 22 illustrates another example cross section view taken along X'-X of the strip mine 1400 of FIG. 14 including additional parts (e.g., pressure cell 2204) of the pressure vessel 2210 disposed in all of the illustrated mining strips (e.g., S1 through SN) in accordance with some embodiments of the inventive concept. The dimensional break 1505 represents a conceptual break in the length of a completed big mass battery 2215. In other words, there is no actual physical break or physical item shown by 1505. The active mining face (e.g., 1605 of FIG. 16) need not be present in the completed big mass battery 2215.

As shown in FIG. 22, the big mass battery 2215 includes mine overburden (e.g., 2205) disposed atop the manufactured pressure vessel 2210. The manufactured pressure vessel 2210 can include multiple pressure cells (e.g., 1802, 1902, 2002, and 2204). Walls of the manufactured pressure vessel 2210 and of each individual pressure cells (e.g., 1802, 1902, 2002, and 2204) can include a substantially impermeable layer that is capable of substantially containing a fluid such as compressed air, water, or the like. For example, the impermeable layer of the walls of the manufactured pressure vessel 2210 and/or of the individual pressure cells (e.g., 1802, 1902, 2002, and 2204) can be constructed of rubber. The rubber material can be recycled rubber, for example, from discarded rubber tires. Each of the individual pressure cells (e.g., 1802, 1902, 2002, and 2204) can also contain porous earthen materials such as sand, gravel, stones, or the like, within which the fluid (e.g., air, water, or the like) can permeate.

Gravity can cause the mine overburden 2205 to apply pressure to the pressure vessel 2210. Each of the pressure cells (e.g., 1802, 1902, 2002, and 2204) of the pressure vessel 2210 can include one or more interface sections 140 through which the fluid (e.g., air, water, or the like) can enter and exit each of the pressure cells (e.g., 1802, 1902, 2002, and 2204) of the pressure vessel 2210 via one or more pressure lines (e.g., 142 and 144). For example, the fluid can enter the pressure cell (e.g., 1802, 1902, 2002, and 2204) of the pressure vessel 2210 via pressure line 144 and/or exit the pressure cell (e.g., 1802, 1902, 2002, and 2204) of the pressure vessel 2210 via pressure line 142. The pressure lines (e.g., 142 and 144) can include a pipe, a hose, a tunnel, or the like. In some embodiments, a single pressure line can be used through which the fluid can both enter and exit a particular pressure cell (e.g., 1802, 1902, 2002, and 2204) of the pressure vessel 2210. The pressure lines (e.g., 142 and 144) can be connected to a turbine center 145. The pressure lines (e.g., 142 and 144) can be connected to two or more pressure cells (e.g., 1802, 1902, 2002, and 2204). In some embodiments, the pressure lines coming from each pressure cell (e.g., 1802, 1902, 2002, and 2204) of the pressure vessel 2210 can be combined into a single master pressure line, or into two master pressure lines. The single master pressure line and/or the two master pressure lines can be connected to the turbine center 145. The turbine center 145 can include one or more turbines (e.g., 150 and 155). The one or more turbines (e.g., 150 and 155) can generate electricity by way of pressurized fluid received via the one or more pressure lines (e.g., 142 and 144), or master pressure lines. Alternatively or in addition, the one or more turbines (e.g., 150 and 155) can pump fluid into the pressurized vessel 2210 via the one or more pressure lines (e.g., 142 and 144), or master pressure lines.

The turbine center 145 can be connected to a power station 160 via electrical line 152. The electrical line 152 can be, for example, an electrical cable. The turbine center 145 can provide electricity to the power station 160 via the electrical line 152. In some embodiments, the turbine center 145 can draw electricity from the power station 160 via the electrical line 152. The power station 160 can be connected to a wind farm 165 via electrical line 170, and/or to a solar farm 175 via electrical line 180. The power station 160 can receive electricity from the wind farm 165 via the electrical line 170, and/or from the solar farm 175 via the electrical line 180. The power station 160 can provide electricity to the electrical grid via an electrical line 185 and power grid lines 190, and/or receive electricity from the electrical grid via the electrical line 185 and the power grid lines 190.

During off-peak times, or when the power station 160 otherwise receives electricity from the wind farm 165, the solar farm 175, and/or the power grid lines 190, that is more than can be immediately accommodated or transferred to the grid, the power station 160 can send the excess electricity to the turbine center 145 via the electrical line 152. The turbine center 145 can then pump the fluid (e.g., air, water, or the like) into the pressure cells (e.g., 1802, 1902, 2002, and 2204) of the pressure vessel 2210 via the one or more pressure lines (e.g., 142 and 144), which provides gravity and pressure-based energy storage on a massive scale.

Figure 23:
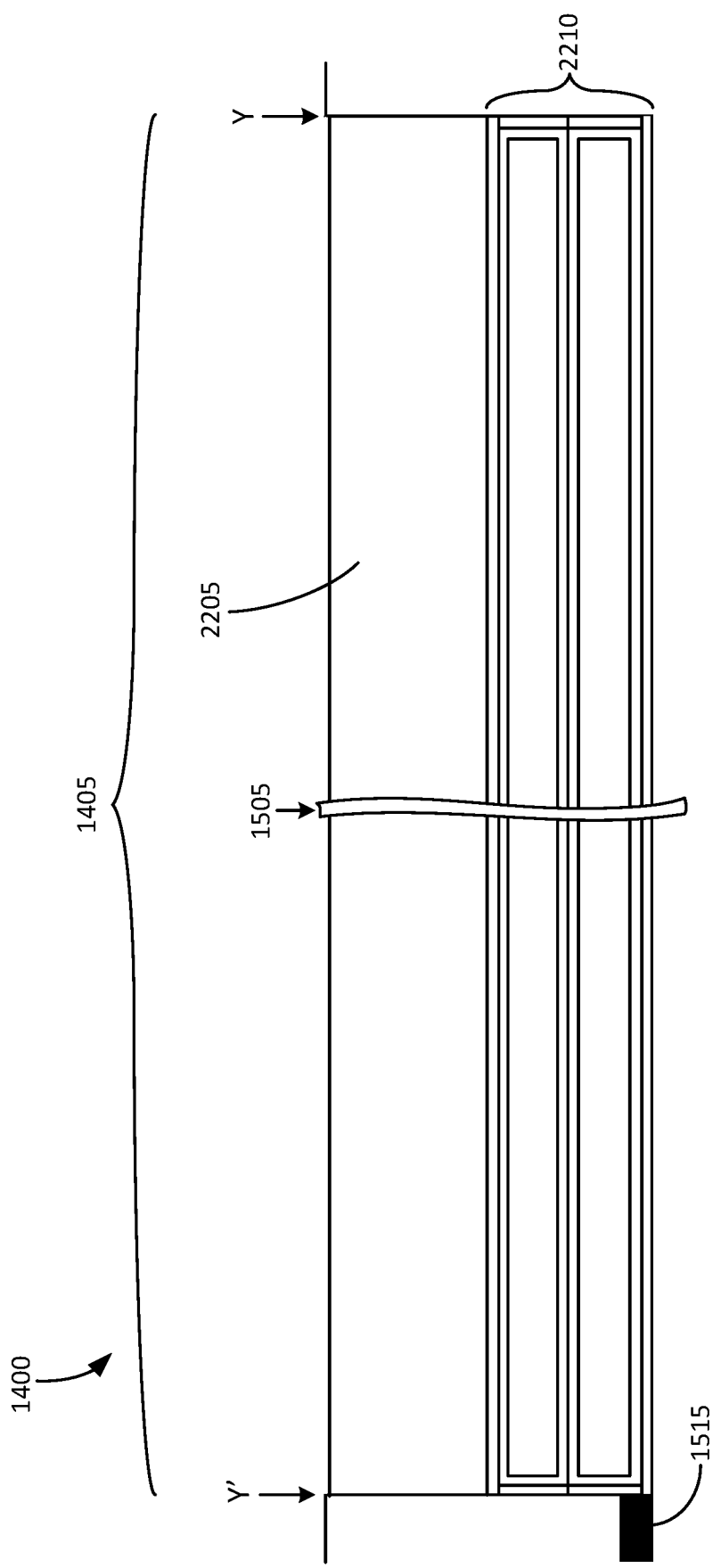
FIG. 23 illustrates an example cross section view taken along Y'-Y of the strip mine of FIG. 14 including the pressure vessel disposed along the length of a mining strip in accordance with some embodiments of the inventive concept.

FIG. 23 illustrates an example cross section view taken along Y'-Y of the strip mine 1400 of FIG. 14 including the pressure vessel 2210 disposed along the length of a mining strip (e.g., S1) in accordance with some embodiments of the inventive concept. Some of the elements are described above, and thus, a detailed description of such elements is not repeated. As can be seen in this length-wise view of a mining strip, each individual pressure cell (e.g., 1802) of the pressure vessel 2210 can be contiguous along the entire length as shown at 1405 of a particular mining strip (e.g., S1).

Figure 24:
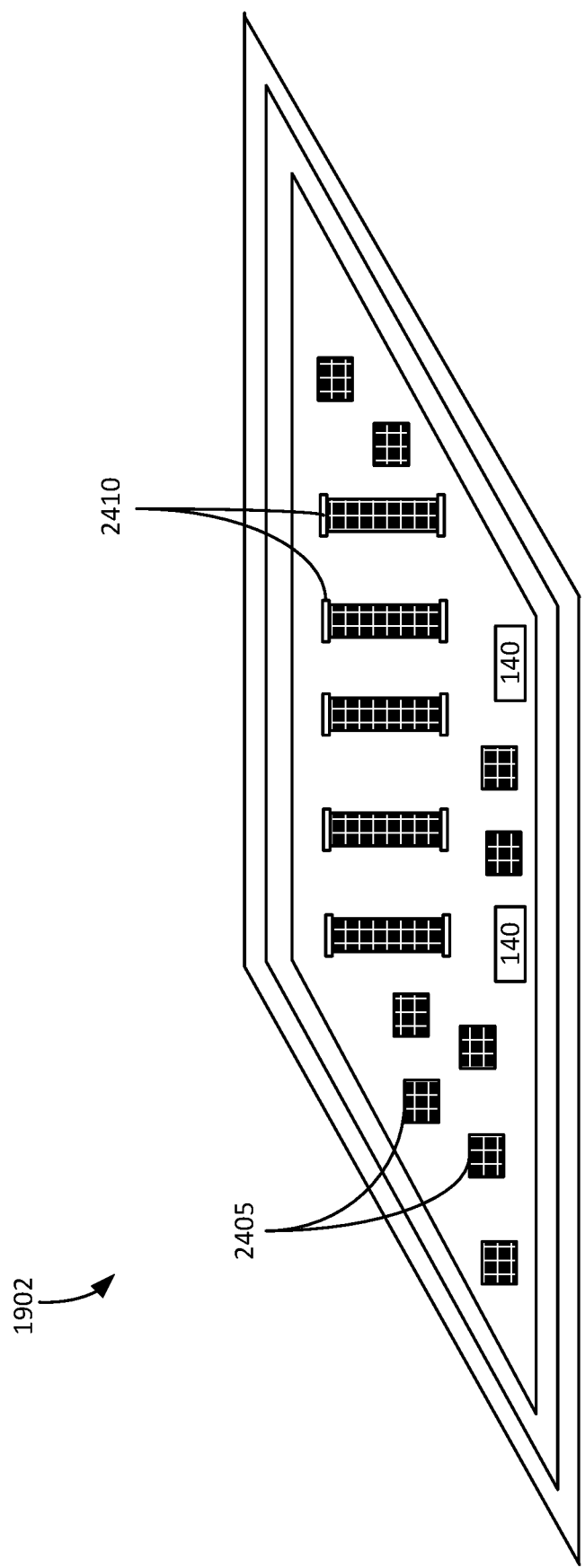
FIG. 24 illustrates an example pressure cell of the pressure vessel of FIG. 14, including enhanced porosity parts disposed therein, in accordance with some embodiments of the inventive concept.

FIG. 24 illustrates an example pressure cell 1902 of the pressure vessel 2210 of FIG. 14, including enhanced porosity parts (e.g., 2405 and 2410) disposed therein, in accordance with some embodiments of the inventive concept. The enhanced porosity parts can include, for example, porous or semi-porous concrete blocks 2405, perforated piping 2410, or the like. The enhanced porosity parts (e.g., 2405 and 2410) can provide internal rigid structure to the individual pressure cells (e.g., 1902) while also increasing porosity within the individual pressure cells (e.g., 1902), so that more fluid (e.g., air, water, or the like) can be stored and pressurized within the pressure vessel 2210 (of FIG. 22).

Figure 25:
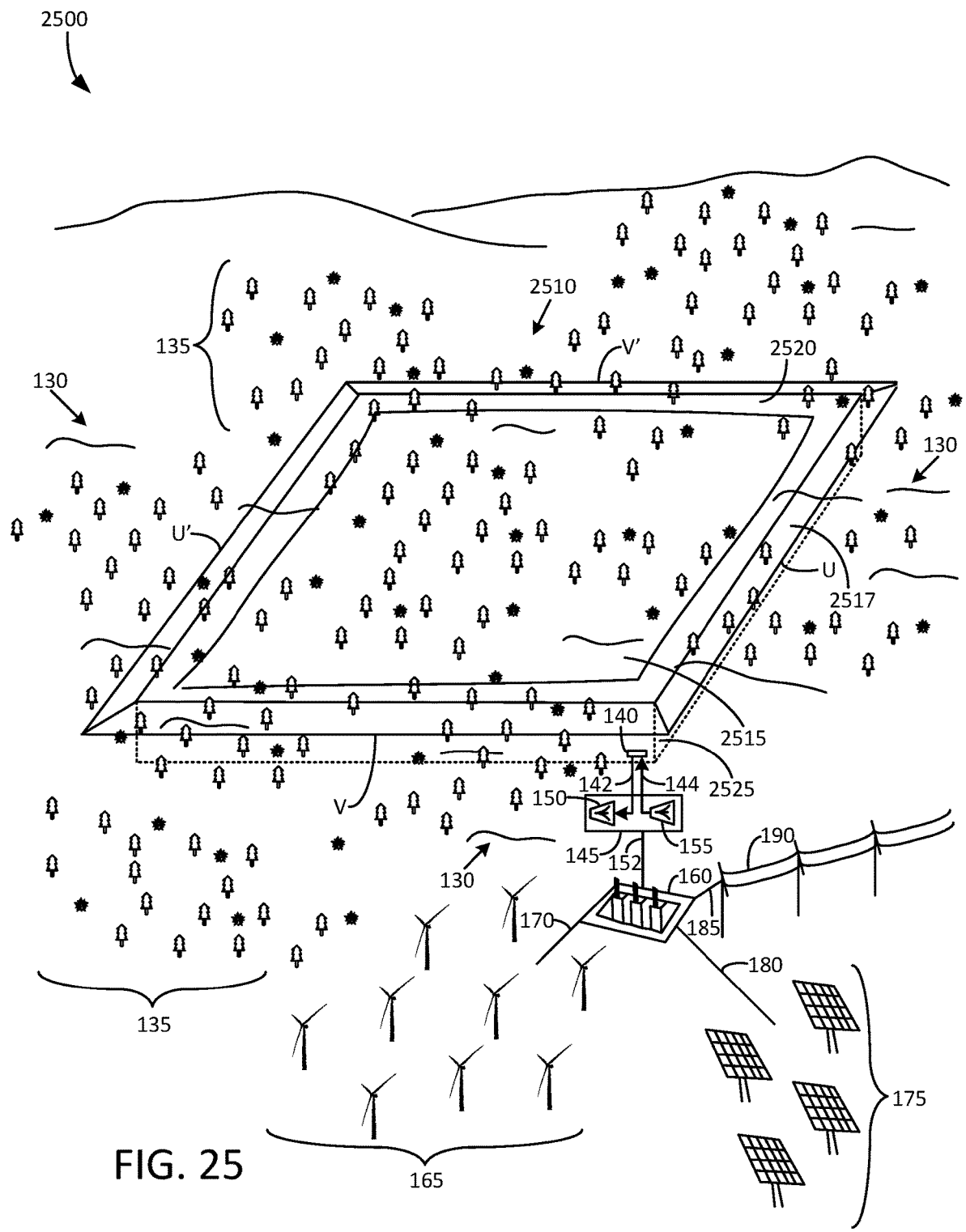
FIG. 25 illustrates an example perspective view of a big mass battery system including a big mass battery and a manufactured pressure vessel for energy storage, built in the vicinity of a landfill, in accordance with various embodiments of the inventive concept.

FIG. 25 illustrates an example perspective view of a big mass battery system 2500 including a big mass battery 2510 and a manufactured pressure vessel 2525 for energy storage, built in the vicinity of a landfill, in accordance with various embodiments of the inventive concept.

General edge boundaries of the big mass battery 2510 are indicated by U', U, V', and V designators. The big mass battery 2510 includes landfill municipal solid waste 2515 disposed atop the manufactured pressure vessel 2525, and big mass side extensions 2517 surrounding the landfill municipal solid waste 2515 on all sides. The big mass battery 2510 can occupy the landfill. The upper surface 2520 of the landfill waste 2515 and the big mass side extensions 2517 can be remediated. For example, trees and vegetation (e.g., 135) can be planted to grow on the remediated surface 2520, farmland cultivated, grazing areas established, or the like. The upper surface 2520 of the landfill waste 2515 can be substantially coplanar with a surface 130 of the surrounding terrain. Side and upper walls of the manufactured pressure vessel 2525 can include a substantially impermeable layer that is capable of substantially containing a fluid such as compressed air, water, or the like. For example, the impermeable layer of the upper walls of the manufactured pressure vessel 2525 can be constructed of rubber. The rubber material can be part of a landfill bottom liner. Also, for example, the impermeable layer of the side walls can be constructed of concrete, earthen slurry, steel pilings, or the like. The pressure vessel 2525 can also contain porous earthen materials such as natural formation, sand, gravel, stones, or the like, within which the fluid (e.g., air, water, or the like) can permeate. In some embodiments, the big mass battery 2510 is about 1200 meters long and about 1200 meters wide. It will be understood that other suitable dimensions are possible without departing from the various embodiments of the inventive concept disclosed herein.

Gravity can cause the landfill municipal solid waste 2515 to apply pressure to the pressure vessel 2525. The pressure vessel 2525 can include an interface section 140 through which the fluid (e.g., air, water, or the like) can enter and exit the pressure vessel 2525 via one or more pressure lines (e.g., 142 and 144). For example, the fluid can enter the pressure vessel 2525 via pressure line 144 and/or exit the pressure vessel 2525 via pressure line 142. The pressure lines (e.g., 142 and 144) can include a pipe, a hose, a tunnel, or the like. In some embodiments, a single pressure line can be used through which the fluid can both enter and exit the pressure vessel 2525. The pressure lines (e.g., 142 and 144) can be connected to a turbine center 145. The turbine center 145 can include one or more turbines (e.g., 150 and 155). The one or more turbines (e.g., 150 and 155) can generate electricity by way of pressurized fluid received via the one or more pressure lines (e.g., 142 and 144). Alternatively or in addition, the one or more turbines (e.g., 150 and 155) can pump fluid into the pressurized vessel 2525 via the one or more pressure lines (e.g., 142 and 144).

The turbine center 145 can be connected to a power station 160 via an electrical line 152. The electrical line 152 can be, for example, an electrical cable. The turbine center 145 can provide electricity to the power station 160 via the electrical line 152. In some embodiments, the turbine center 145 can draw electricity from the power station 160 via the electrical line 152. The power station 160 can be connected to a wind farm 165 via electrical line 170, and/or to a solar farm 175 via electrical line 180. The power station 160 can receive electricity from the wind farm 165 via the electrical line 170, and/or from the solar farm 175 via the electrical line 180. The power station 160 can provide electricity to the electrical grid via an electrical line 185 and power grid lines 190, and/or receive electricity from the electrical grid via the electrical line 185 and the power grid lines 190.

During off-peak times, or when the power station 160 otherwise receives electricity from the wind farm 165, the solar farm 175, and/or the power grid lines 190, that is more than can be immediately accommodated or transferred to the grid, the power station 160 can send the excess electricity to the turbine center 145 via the electrical line 152. The turbine center 145 can then pump the fluid (e.g., air, water, or the like) into the pressure vessel 2525 via the one or more pressure lines (e.g., 142 and 144), which provides gravity and pressure-based energy storage on a massive scale.

Figure 26:
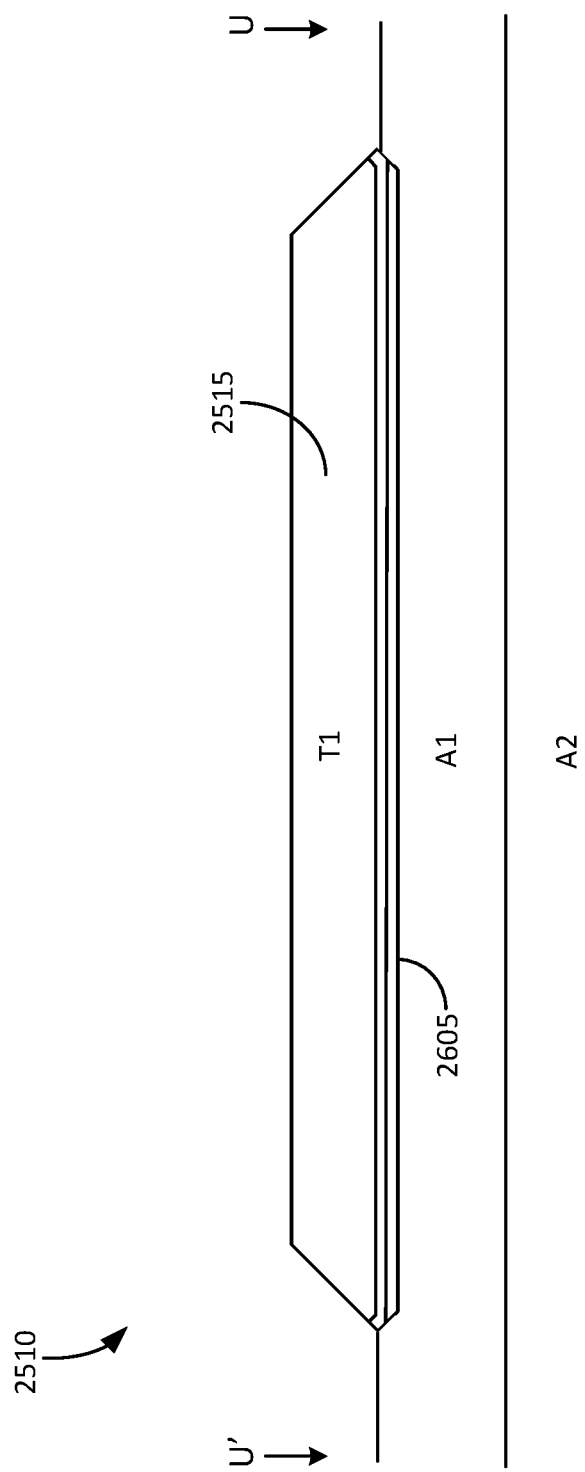
FIG. 26 illustrates an example cross sectional view taken along U'-U of the big mass battery prior to construction of the manufactured pressure vessel of FIG. 25.

FIG. 26 illustrates an example cross sectional view taken along U'-U of the big mass battery 2510 prior to construction of the manufactured pressure vessel 2525 of FIG. 25. Some of the elements are described above, and thus, a detailed description of such elements is not repeated. The layer T1 includes municipal solid waste 2515. A landfill bottom liner 2605 separates the layer T1 and the layer A1. Most landfills have the bottom liner 2605 as a standard industry practice. The layer A1 can be a porous medium part composed of natural formation, which is further described below. The layer A2 can be either a porous or a non-porous lower part composed of natural formation, which is further described below. The landfill bottom liner 2605 serves as a pressure cell top part of a pressure vessel, as further described below.

Figure 27:
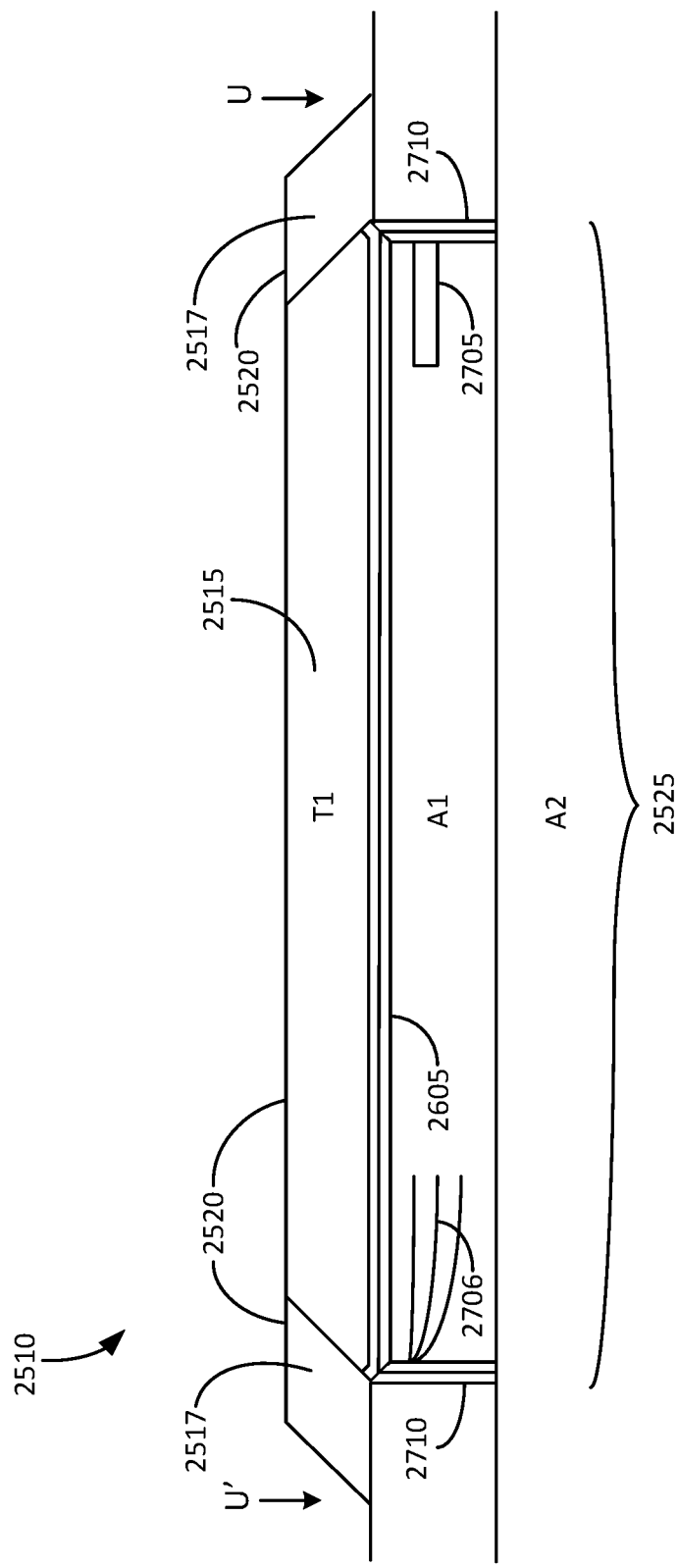
FIG. 27 illustrates another example cross sectional view taken along U'-U of the big mass battery including the manufactured pressure vessel of FIG. 25.

FIG. 27 illustrates another example cross sectional view taken along U'-U of the big mass battery including the manufactured pressure vessel 2525 of FIG. 25. Some of the elements are described above, and thus, a detailed description of such elements is not repeated. The manufactured pressure vessel 2525 can include layer A1, which is a porous medium part composed of natural formation. The manufactured pressure vessel 2525 can include a pressure cell top part 2605 composed of the landfill bottom liner 2605. In addition, the manufactured pressure vessel 2525 can include substantially vertical pressure cell side parts 2710, which can include a non-porous impermeable layer, such as concrete, earthen slurry, or the like. Moreover, the manufactured pressure vessel 2525 can include a pressure cell bottom part composed of layer A2, which can be a non-porous part composed of natural formation. Big mass side extensions 2517 can be added to pressurize bond between the pressure cell top part 2605 and the substantially vertical pressure cell side parts 2710. The pressure cell porous medium part layer A1 can be surrounded by the pressure cell top part 2605, the pressure cell side parts 2710, and the pressure cell bottom part A2.

The manufactured pressure vessel 2525 can include enhanced porosity parts (e.g., 2705 and 2706) disposed therein, in accordance with some embodiments of the inventive concept. The enhanced porosity parts can include, for example, tunnels 2705, drill holes 2706, or the like. The enhanced porosity parts (e.g., 2705 and 2706) can maintain the internal rigid structure to the porous medium part layer A1 while also increasing porosity within the porous medium part layer A1, so that more fluid (e.g., air, water, or the like) can be stored and pressurized within the manufactured pressure vessel 2525.

The pressure vessel 2525 can include an interface section 140 (of FIG. 25) through which the fluid (e.g., air, water, or the like) can enter and exit the pressure vessel 2525 via one or more pressure lines (e.g., 142 and 144 of FIG. 25).

Figure 28:
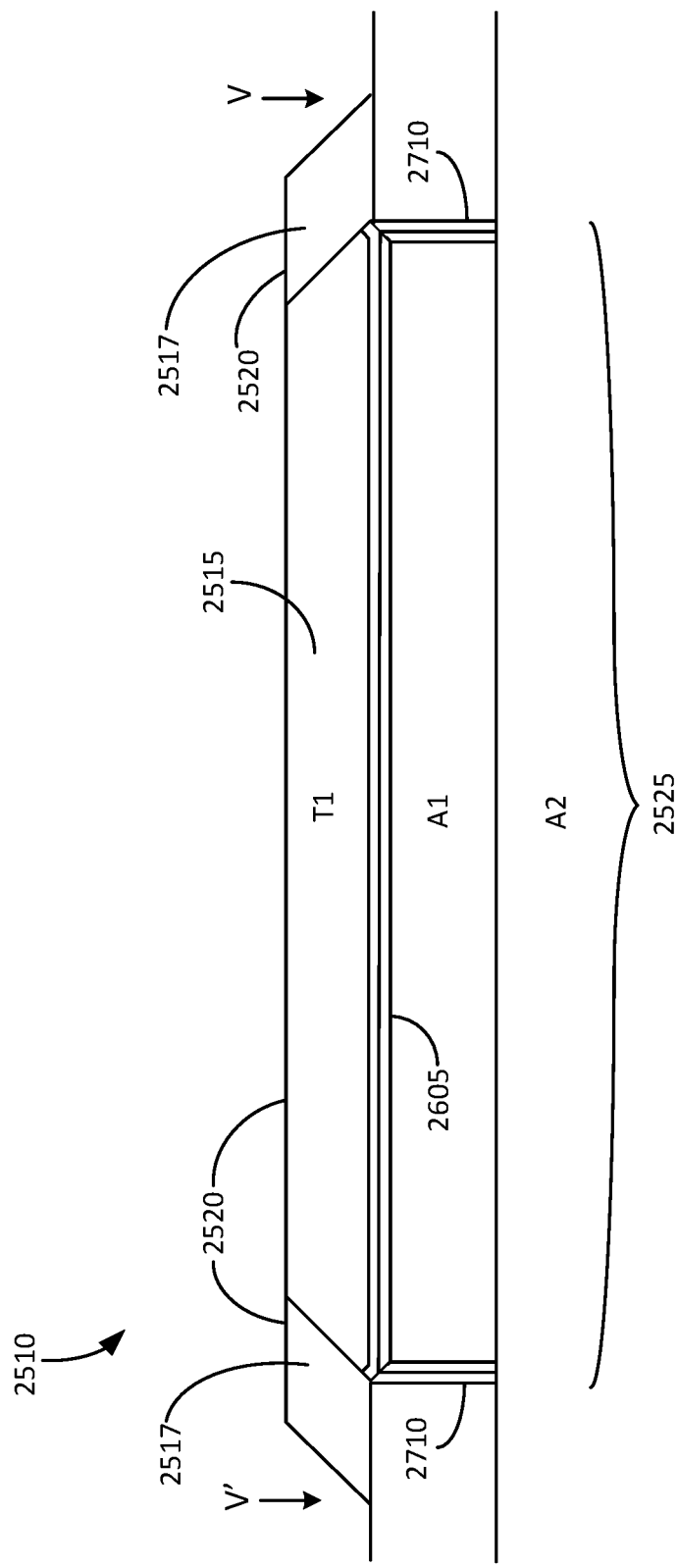
FIG. 28 illustrates yet another example cross sectional view taken along V'-V of the big mass battery including the manufactured pressure vessel of FIG. 25.

FIG. 28 illustrates yet another example cross sectional view taken along V'-V of the big mass battery 2510 including the manufactured pressure vessel 2525 of FIG. 25. Some of the elements are described above, and thus, a detailed description of such elements is not repeated. This view is of the big mass battery 2510 of FIG. 27, but taken along V'-V rather than U'-U.

Figure 29:
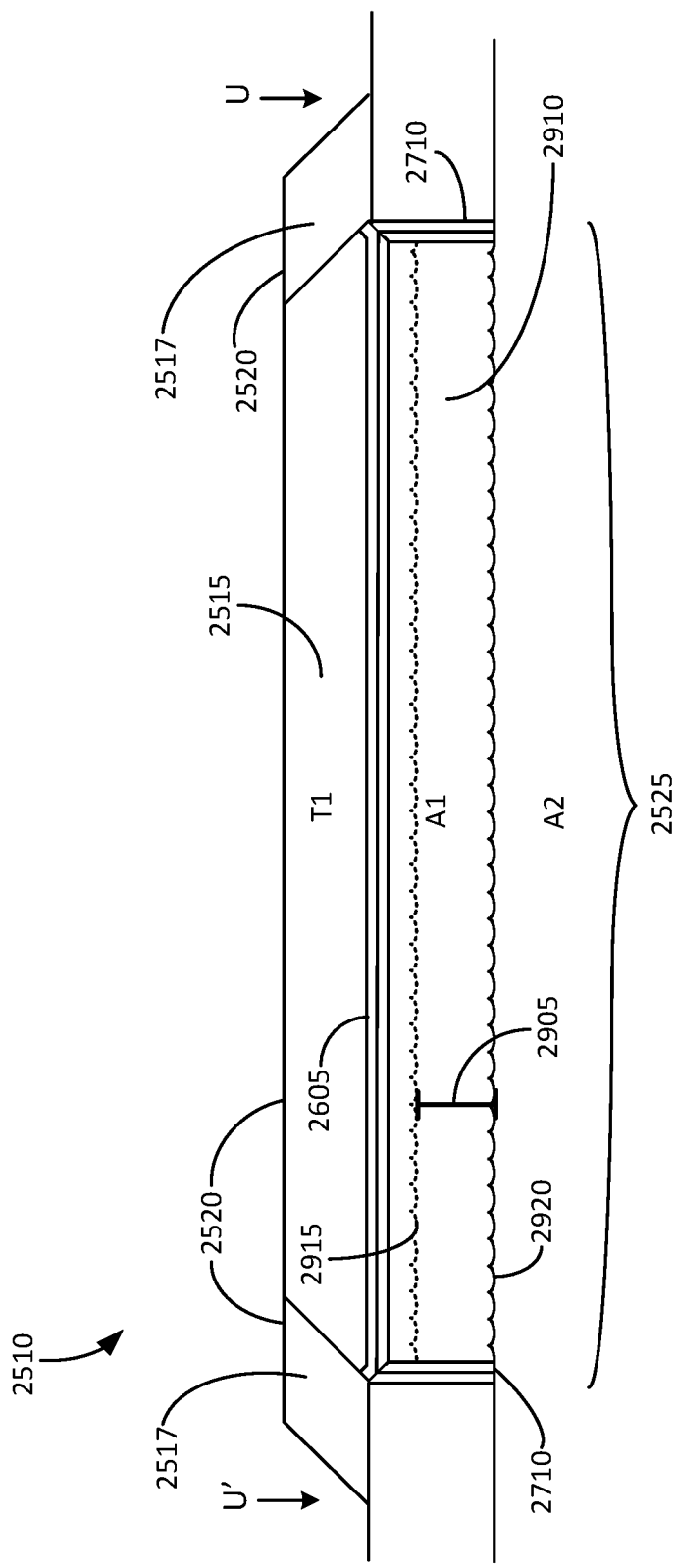
FIG. 29 illustrates still another example cross sectional view taken along U'-U of the big mass battery including the manufactured pressure vessel of FIG. 25.

FIG. 29 illustrates still another example cross sectional view taken along U'-U of the big mass battery 2510 including the manufactured pressure vessel 2525 of FIG. 25. Some of the elements are described above, and thus, a detailed description of such elements is not repeated.

The pressure vessel 2525 can include a landfill bottom liner 2605, which forms a top part of the pressure vessel 2525. The pressure vessel 2525 can further include substantially vertical side parts 2710, which can include an impermeable layer. For example, the impermeable layer of the vertical side parts 2710 of the pressure vessel 2525 can be constructed of concrete, earthen slurry, steel pilings, or the like. The big mass battery 2510 can include big mass side extensions 2517 surrounding the landfill municipal solid waste 2515, which can pressurize bond between the pressure cell top part 2605 and the substantially vertical pressure cell side parts 2710.

In this embodiment, an open bottom high water table is part of the big mass battery 2510. Layer A2 can include either a porous medium part or a non-porous part composed of natural formation. Layer A2 can be a continuation of layer A1. In some embodiments, a porous contact may exist between layers A1 and A2. Layer A1 includes a natural groundwater level 2915 that can be within a particular distance of the top surface of big mass extensions 2517. The particular distance can be between about one (1) meter and five (5) meters. In this example embodiment, the manufactured pressure vessel 2525 includes the porous medium part layer A1 composed of natural formation. In addition, the manufactured pressure vessel 2525 can include at least a part of the layer A2, which can be a porous medium part composed of natural formation, or a non-porous part composed of natural formation. The manufactured pressure vessel 2525 can be surrounded by the pressure cell top part 2605, the pressure cell side parts 2710 composed of manufactured non-porous medium parts, and the pressure cell bottom part composed of layer A2 porous medium part natural formation, which is below the natural groundwater level 2915. The manufactured pressure vessel 2525 can include enhanced porosity parts (e.g., 2705 and 2706 of FIG. 27) disposed therein, in accordance with some embodiments of the inventive concept.

Gravity can cause the landfill waste 2515 to apply pressure to the pressure vessel 2525, such that a normal groundwater level 2915 is displaced by a displacement amount 2905 to a pressurized ground water level 2920. Groundwater displacement is the vertical offset between the natural groundwater level 2915 and the pressurized ground water level 2920. Pressure is given by $1000 \text{ kg} \cdot \text{m}^{-3} * 9.8 \text{ m} \cdot \text{s}^{-2} *$ groundwater displacement (e.g., 2905). The pressure vessel 2525 can include an interface section 140 (of FIG. 25) through which the fluid (e.g., air, water, or the like) can enter and exit the pressure vessel 2525 via one or more pressure lines (e.g., 142 and 144 of FIG. 25).

Figure 30:
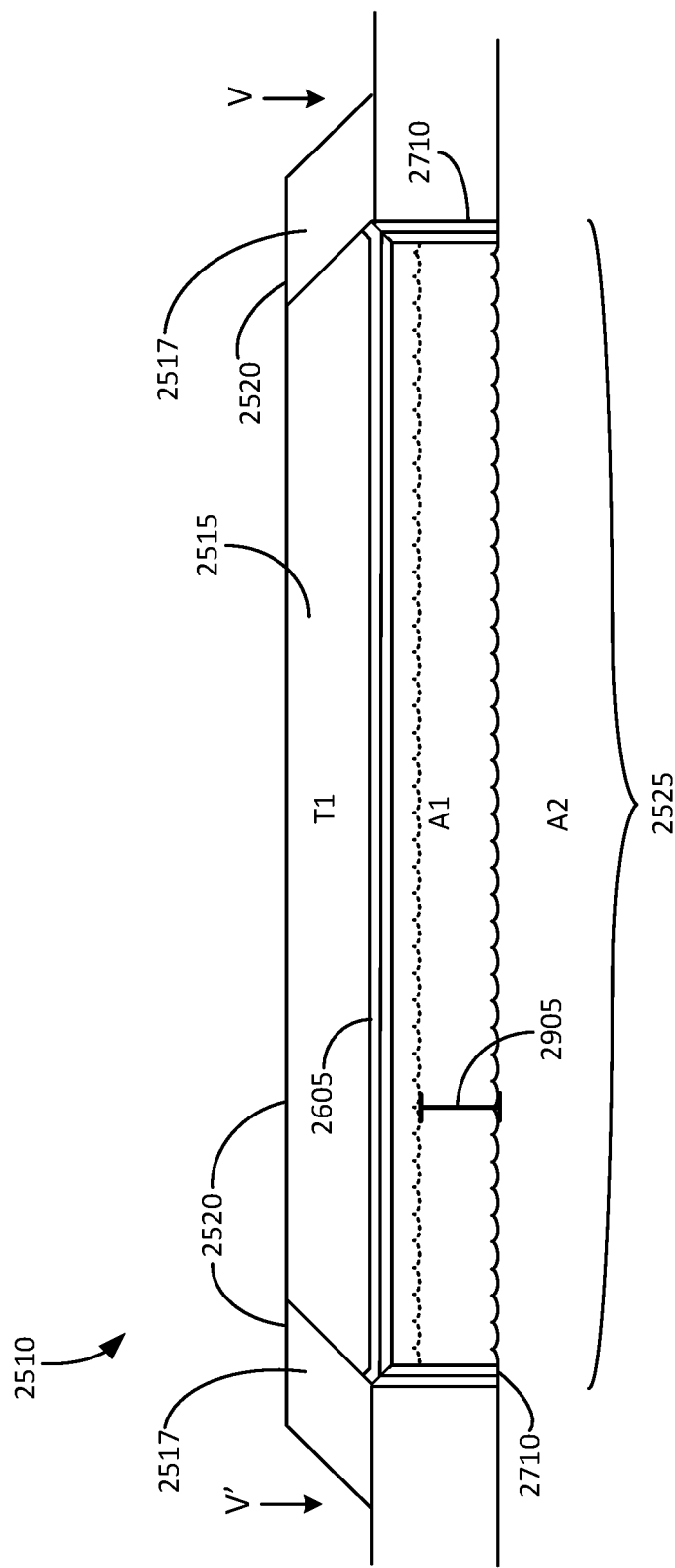
FIG. 30 illustrates still another example cross sectional view taken along V'-V of the big mass battery including the manufactured pressure vessel of FIG. 25.

FIG. 30 illustrates still another example cross sectional view taken along V'-V, rather than U'-U (of FIG. 29) of the big mass battery including the manufactured pressure vessel of 2525 FIG. 25. Some of the elements are described above, and thus, a detailed description of such elements is not repeated.

Energy is stored in a big mass battery device by pushing air into the closed pressure vessel, thereby compressing the air, and thereby increasing the pressure of the air within the big mass battery pressure vessel. Electricity can be produced from the big mass battery device by releasing the pressurized air on-demand to run one or more turbines.

The effective volume of a big mass battery pressure vessel (i.e., the volume available for energy storage using compressed air) may be derived from characteristics of the porous medium part that, for example, can make up a majority of the overall volume of the big mass battery pressure vessel. The porous medium part of the big mass battery pressure vessel can have an average porosity. Porosity is the fraction of material, by volume, that is devoid of solid material, interconnected, filled with air or filled with water, which can be replaced with air. The big mass can have porosities of 0.10-0.20 or higher when incorporated into a big mass battery device. A big mass battery pressure vessel having dimensions on the order of 1 km$^2$ map area, 25 meters of depth, and porous medium part porosity of 0.20, has an effective energy storage volume of about $5.0000 \times 10^6$ m$^3$.

The big mass that is set upon the pressure vessel can be referred to as a pressurizing big mass part. The pressure vessel can be pressurized by the pressurizing big mass part that is set upon it. The maximum pressure that can be sustained by the big mass pressure vessel can be determined largely by the mass per unit area of the pressurizing big mass part that is set upon the pressure vessel. For example, a pressure vessel that is disposed beneath twenty-five (25) meters of pressurizing big mass part having a density of 2,250 kg·m$^{-3}$ may sustain a pressure of about $5.5125 \times 10^5$ Pascal (Pa) in pressure cells adjacent to the pressurizing big mass part.

Thus, a big mass pressure vessel of effective volume of $5.0000 \times 10^6$ m$^3$ filled with air at a pressure of $5.5125 \times 10^5$ Pa, producing electricity at an overall efficiency of 0.50, can store about $7.6565 \times 10^5$ kW·h per fill, which equates to about $1.1485 \times 10^8$ kW·h per year, or 13.10 MW continuous power for one (1) year when filled 300 times per year.

Additional energy may be stored in a big mass battery device by continuing to pump air into the pressure vessel, thereby lifting the pressurizing big mass part that is set upon the pressure vessel, thereby increasing the volume of the pressure vessel. For example, lifting the pressurizing big mass part by an average of one (1) meter can yield a volume added due to lift of the big mass pressure vessel top part and overlying pressurizing big mass part of about $1.0000 \times 10^6$ m$^3$, stores about $1.5313 \times 10^5$ kWh per fill, which equates to about $2.2970 \times 10^7$ kW·h per year, or about 2.62 MW continuous power for one (1) year when filled 300 times per year.

In some embodiments, enhanced porosity parts are added to the pressure cell interior. In some embodiments, underground mine workings or caverns can be converted to one or more pressure cell for a big mass battery pressure vessel.

Alternative embodiments of the present invention may be built by re-activating and putting back into transit, for another purpose such as minimizing pollution sources, big mass that had previously been placed in temporary or permanent storage. Some of humanity's most toxic and/or undesirable materials may be placed in a big mass battery device to fully contain, isolate, and control them, such as material that produces additional unwanted negative effects due to exposure to and/or chemical connection with the surface and near-surface environment. Constructing a big mass battery device using re-activated, previously stored big mass may be desirable to society, especially if moving the big mass accomplishes another societal goal such as environmental cleanup associated with and/or remediated by moving the big mass.

Several types of pollution may be associated with big mass removed from and permanently stored next to an open pit mine. For example, water may accumulate in an inactive open pit and the water may become highly polluted due to chemical and physical interaction between the meteoric and/or ground water, atmosphere, and rock exposed within the pit by the mining activity. Pollutants may be derived from and emanate from the stored big mass due to chemical and physical interaction between meteoric and/or ground water, the atmosphere, and rock exposed within the big mass by the mining Big mass in the form of old municipal solid waste, old mine waste sites, coal ash, and chemically and/or isotopically contaminated soil and rock may be moved, sorted, consolidated, isolated, and controlled by constructing a big mass battery device. Alternative embodiments of the present invention may use municipal solid waste previously placed into permanent storage. Pollution associated with the big mass may be stopped and remediated.

Some embodiments include a big mass battery, comprising a manufactured pressure vessel including one or more pressure cells having an impermeable layer containing porous material in which air can permeate, and a big mass layer disposed atop the manufactured pressure vessel to pressurize the air within the pressure vessel.

In some embodiments, the impermeable layer includes rubber from recycled vehicle tires. In some embodiments, the big mass layer has a total weight of between one (1) million and one (1) billion tonnes, or more. In some embodiments, the big mass layer includes a remediated upper surface including at least one of a tree, vegetation, farmland, or a grazing area. In some embodiments, a depth of the manufactured pressure vessel is about twenty-five (25) meters, and a depth of the big mass layer is about twenty-five (25) meters.

In some embodiments, the big mass battery further comprises an interface section through which the air can enter and exit the pressure vessel, one or more pressure lines coupled to the interface section, and a turbine center coupled to the one or more pressure lines, wherein the turbine center includes one or more turbines configured to generate electricity in response to the pressurized air received through the one or more pressure lines.

In some embodiments, the one or more turbines are configured to pump air through the one or more pressure lines into the pressure vessel to pressurize the pressure vessel. In some embodiments, the manufactured pressure vessel further comprises a first impermeable pressure cell containing first porous earthen materials and first pressurized air, a second impermeable pressure cell atop the first impermeable pressure cell, the second impermeable pressure cell containing second porous earthen materials and second pressurized air, an interface section in the first impermeable pressure cell of the manufactured pressure vessel through which the first pressurized air can enter and exit the first impermeable pressure cell of the pressure vessel, an interface section in the second impermeable pressure cell of the manufactured pressure vessel through which the second pressurized air can enter and exit the second impermeable pressure cell of the pressure vessel, and one or more pressure lines coupled to the interface section. In some embodiments, the big mass battery occupies a strip mine.

In some embodiments, the manufactured pressure vessel further comprises a first impermeable pressure cell containing first porous earthen materials and first pressurized air a second impermeable pressure cell atop the first impermeable pressure cell, the second impermeable pressure cell containing second porous earthen materials and second pressurized air, a third impermeable pressure cell atop the second impermeable pressure cell, the third impermeable pressure cell containing third porous earthen materials and third pressurized air, an interface section in the first impermeable pressure cell of the manufactured pressure vessel through which the first pressurized air can enter and exit the first impermeable pressure cell of the pressure vessel, an interface section in the second impermeable pressure cell of the manufactured pressure vessel through which the second pressurized air can enter and exit the second impermeable pressure cell of the pressure vessel, an interface section in the third impermeable pressure cell of the manufactured pressure vessel through which the third pressurized air can enter and exit the third impermeable pressure cell of the pressure vessel, and one or more pressure lines coupled to the interface section, wherein the big mass battery occupies a strip mine.

In some embodiments, the manufactured pressure vessel further comprises a single impermeable pressure cell containing porous earthen materials and pressurized air, wherein a lower portion of the pressure cell has a first diameter, a middle portion of the pressure cell has a second diameter greater than the first diameter, and an upper portion of the pressure cell has a third diameter greater than the second diameter, an interface section in the impermeable pressure cell of the manufactured pressure vessel through which the pressurized air can enter and exit the impermeable pressure cell of the pressure vessel, and one or more pressure lines coupled to the interface section, wherein the big mass battery occupies an open pit mine.

In some embodiments, the manufactured pressure vessel further comprises a first impermeable pressure cell containing first porous earthen materials and first pressurized air, wherein a lower portion of the first pressure cell has a first diameter, and an upper portion of the first pressure cell has a second diameter greater than the first diameter, a second impermeable pressure cell atop the first impermeable pressure cell, the second impermeable pressure cell containing second porous earthen materials and second pressurized air, wherein a lower portion of the second pressure cell has a first diameter, and an upper portion of the second pressure cell has a second diameter greater than the first diameter, an interface section in the first impermeable pressure cell of the manufactured pressure vessel through which the first pressurized air can enter and exit the first impermeable pressure cell of the pressure vessel, an interface section in the second impermeable pressure cell of the manufactured pressure vessel through which the second pressurized air can enter and exit the second impermeable pressure cell of the pressure vessel, and one or more pressure lines coupled to the interface section, wherein the big mass battery occupies an open pit mine.

In some embodiments, the manufactured pressure vessel further comprises a first impermeable pressure cell containing first porous earthen materials and first pressurized air, wherein the first impermeable pressure cell has a first diameter a second impermeable pressure cell atop the first impermeable pressure cell, the second impermeable pressure cell containing second porous earthen materials and second pressurized air, wherein the second impermeable pressure cell has a second diameter greater than the first diameter, a third impermeable pressure cell atop the second impermeable pressure cell, the third impermeable pressure cell containing third porous earthen materials and third pressurized air, wherein the third impermeable pressure cell has a third diameter greater than the second diameter, an interface section in the first impermeable pressure cell of the manufactured pressure vessel through which the first pressurized air can enter and exit the first impermeable pressure cell of the pressure vessel, an interface section in the second impermeable pressure cell of the manufactured pressure vessel through which the second pressurized air can enter and exit the second impermeable pressure cell of the pressure vessel, an interface section in the third impermeable pressure cell of the manufactured pressure vessel through which the third pressurized air can enter and exit the third impermeable pressure cell of the pressure vessel, and one or more pressure lines coupled to the interface section, wherein the big mass battery occupies an open pit mine.

In some embodiments, the manufactured pressure vessel further comprises a first impermeable substantially rhombus pressure cell containing first porous earthen materials, first pressurized air, and a first interface section through which the first pressurized air can enter and exit the first impermeable pressure cell of the pressure vessel, a second impermeable pressure cell atop the first impermeable pressure cell, the second impermeable pressure cell containing second porous earthen materials, second pressurized air, and a second interface section through which the second pressurized air can enter and exit the second impermeable pressure cell of the pressure vessel, and a third impermeable substantially rhombus pressure cell adjacent the first impermeable pressure cell, the third impermeable pressure cell containing third porous earthen materials, third pressurized air, and a third interface section through which the third pressurized air can enter and exit the third impermeable pressure cell of the pressure vessel, wherein the big mass battery occupies a strip mine.

In some embodiments, the manufactured pressure vessel further comprises a landfill bottom liner, one or more substantially vertical impermeable pressure cell side parts coupled to the landfill bottom liner, a first pressure cell porous medium part layer including natural formation and containing pressurized air, an interface section in the first pressure cell porous medium part layer of the manufactured pressure vessel through which the pressurized air can enter and exit the first pressure cell of the pressure vessel, and one or more pressure lines coupled to the interface section, wherein the big mass battery occupies a landfill.

Some embodiments of the inventive concept include a method for constructing a big mass battery using big mass in transit at a strip mine. The method can include removing first mine overburden of a first mining strip from a coal seam of the strip mine, disposing an impermeable pressure cell bottom part in the first mining strip up to an active mining face of the strip mine, disposing an impermeable pressure cell side part in the first mining strip on an opposite end of the mining strip relative to the active mining face, and cast blasting a second mining strip so that second porous mine overburden is deposited on the pressure cell bottom part.

The method can include disposing one or more interface sections on the pressure cell bottom part, disposing an impermeable pressure cell top part over the second porous mine overburden deposited on the pressure cell bottom part, and connecting the impermeable pressure cell top part to the impermeable pressure cell side part and to the impermeable pressure cell bottom part.

The impermeable pressure cell top part can be referred to as a first impermeable pressure cell top part. The method can further include extending the impermeable pressure cell bottom part in the first mining strip into the second mining strip up to the active mining face of the strip mine, vertically extending the impermeable pressure cell side part in the first mining strip, cast blasting a third mining strip so that third porous mine overburden is deposited on the extended pressure cell bottom part, and on the first impermeable pressure cell top part, disposing one or more interface sections on the extended pressure cell bottom part, disposing one or more interface sections on the first impermeable pressure cell top part, disposing a second impermeable pressure cell top part over the third porous mine overburden deposited on the first impermeable pressure cell top part, and connecting the second impermeable pressure cell top part to the extended pressure cell side part and to the first impermeable pressure cell top part.

In some embodiments, disposing the impermeable pressure cell bottom part further comprises disposing a first bottom part protective layer including earthen material, disposing a bottom part seal on the first bottom part protective layer, wherein the bottom part seal includes rubber, and disposing a second bottom part protective layer on the bottom part seal, wherein the second bottom part protective layer includes earthen material.

In some embodiments, disposing the impermeable pressure cell side part further comprises disposing a first side part in the first mining strip on the opposite end of the mining strip relative to the active mining face, wherein the first side part includes a geomembrane, disposing a substantially vertical side part seal adjacent to the first side part, wherein the side part seal includes an impermeable layer of rubber, and disposing a second side part adjacent the vertical side part seal, wherein the second side part includes a geomembrane.

Having described and illustrated the principles of the invention with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for constructing a big mass battery using big mass in transit at a strip mine, the method comprising:
   removing first mine overburden of a first mining strip of the strip mine;
   disposing an impermeable pressure cell bottom part in the first mining strip up to an active mining face of the strip mine;
   disposing an impermeable pressure cell side part in the first mining strip on an opposite end of the mining strip relative to the active mining face; and
   cast blasting a second mining strip so that second porous mine overburden is deposited on the pressure cell bottom part.

2. The method of claim 1, further comprising:
   disposing one or more interface sections on the pressure cell bottom part;
   disposing an impermeable pressure cell top part over the second porous mine overburden deposited on the pressure cell bottom part; and
   connecting the impermeable pressure cell top part to the impermeable pressure cell side part and to the impermeable pressure cell bottom part, thereby forming a first pressure cell.

3. The method of claim 2, the method further comprising:
   extending the impermeable pressure cell bottom part in the first mining strip into the second mining strip up to the active mining face of the strip mine;
   vertically extending the impermeable pressure cell side part in the first mining strip; and
   cast blasting a third mining strip so that third porous mine overburden is deposited on the extended pressure cell bottom part, and on the first impermeable pressure cell top part.

4. The method of claim 3, wherein the impermeable pressure cell top part is referred to as a first impermeable pressure cell top part, the method further comprising:
   disposing one or more interface sections on the extended pressure cell bottom part;
   disposing one or more interface sections on the first impermeable pressure cell top part;
   disposing a second impermeable pressure cell top part over the third porous mine overburden; and
   connecting the second impermeable pressure cell top part to the extended pressure cell bottom part, to the first impermeable pressure cell top part, and to the extended impermeable pressure cell side part, thereby forming a second pressure cell and a third pressure cell.

5. The method of claim 4, wherein disposing the impermeable pressure cell bottom part further comprises:
   disposing a first bottom part protective layer including earthen material;
   disposing a bottom part seal on the first bottom part protective layer, wherein the bottom part seal includes rubber; and
   disposing a second bottom part protective layer on the bottom part seal, wherein the second bottom part protective layer includes earthen material.

6. The method of claim 4, further comprising:
   coupling one or more pressure lines to the one or more interface sections disposed on the pressure cell bottom part;
   coupling the one or more pressure lines to the one or more interface sections disposed on the extended pressure cell bottom part;
   coupling the one or more pressure lines to the one or more interface sections disposed on the first impermeable pressure cell top part;
   coupling a turbine center to the one or more pressure lines;
   pumping air using one or more turbines of the turbine center through the one or more pressure lines into the first pressure cell to pressurize the first pressure cell;
   pumping the air using the one or more turbines of the turbine center through the one or more pressure lines into the second pressure cell to pressurize the second pressure cell;
   pumping the air using the one or more turbines of the turbine center through the one or more pressure lines into the third pressure cell to pressurize the third pressure cell; and
   generating electricity using the one or more turbines of the turbine center in response to pressurized air received through the one or more pressure lines from at least one of the first pressurized pressure cell, the second pressurized pressure cell, or the third pressurized pressure cell.

7. The method of claim 1, wherein disposing the impermeable pressure cell side part further comprises:
   disposing a first side part in the first mining strip on the opposite end of the mining strip relative to the active mining face, wherein the first side part includes a geomembrane;
   disposing a substantially vertical side part seal adjacent to the first side part, wherein the side part seal includes an impermeable layer of rubber; and disposing a second side part adjacent the vertical side part seal, wherein the second side part includes a geomembrane.

8. A big mass battery, comprising:
a manufactured pressure vessel including a plurality of pressure cells each having one or more impermeable layers containing porous material in which air can permeate; and
a big mass layer disposed atop the manufactured pressure vessel to pressurize the air within the manufactured pressure vessel,
wherein the manufactured pressure vessel further comprises:
a first impermeable pressure cell containing first porous earthen materials and first pressurized air;
a second impermeable pressure cell atop the first impermeable pressure cell, the second impermeable pressure cell containing second porous earthen materials and second pressurized air; and
a third impermeable pressure cell atop the second impermeable pressure cell, the third impermeable pressure cell containing third porous earthen materials and third pressurized air,
wherein:
the first impermeable pressure cell has a first diameter;
the second impermeable pressure cell has a second diameter greater than the first diameter; and
the third impermeable pressure cell has a third diameter greater than the second diameter.

9. The big mass battery of claim 8, further comprising:
an interface section in the first impermeable pressure cell of the manufactured pressure vessel through which the first pressurized air can enter and exit the first impermeable pressure cell of the manufactured pressure vessel; and
an interface section in the second impermeable pressure cell of the manufactured pressure vessel through which the second pressurized air can enter and exit the second impermeable pressure cell of the manufactured pressure vessel.

10. The big mass battery of claim 8, further comprising:
an interface section in the first impermeable pressure cell of the manufactured pressure vessel through which the first pressurized air can enter and exit the first impermeable pressure cell of the manufactured pressure vessel;
an interface section in the second impermeable pressure cell of the manufactured pressure vessel through which the second pressurized air can enter and exit the second impermeable pressure cell of the manufactured pressure vessel; and
an interface section in the third impermeable pressure cell of the manufactured pressure vessel through which the third pressurized air can enter and exit the third impermeable pressure cell of the manufactured pressure vessel.

11. The big mass battery of claim 8, wherein the one or more impermeable layers includes rubber from recycled vehicle tires.

12. The big mass battery of claim 8, wherein the big mass layer has a total mass of between one (1) million and one (1) billion tonnes.

13. The big mass battery of claim 8, further comprising:
one or more interface sections through which the air can enter and exit the manufactured pressure vessel;
one or more pressure lines coupled to the one or more interface sections; and
a turbine center coupled to the one or more pressure lines, wherein the turbine center includes one or more turbines configured to generate electricity in response to the pressurized air received through the one or more pressure lines,
wherein the one or more turbines are configured to pump air through the one or more pressure lines into the manufactured pressure vessel to pressurize the manufactured pressure vessel.

* * * * *